United States Patent
Arol et al.

(10) Patent No.: US 7,702,193 B2
(45) Date of Patent: Apr. 20, 2010

(54) OPTICAL CROSSBAR SWITCH

(75) Inventors: Joseph Arol, Kiryat Ono (IL); Zohar Avrahami, Tel Aviv (IL); Menachem Eizenshtat, Ra'anana (IL); Rahav Cohen, Ra'anana (IL); Ze'ev Ganor, Herzelia (IL)

(73) Assignee: FiberZone Networks Ltd., Petach-Tikva (IL)

( * ) Notice: Subject to any disclaimer, the term of this patent is extended or adjusted under 35 U.S.C. 154(b) by 0 days.

(21) Appl. No.: 11/667,837

(22) PCT Filed: Nov. 17, 2005
(Under 37 CFR 1.47)

(86) PCT No.: PCT/IL2005/001220
§ 371 (c)(1),
(2), (4) Date: Jul. 29, 2008

(87) PCT Pub. No.: WO2006/054300
PCT Pub. Date: May 26, 2006

(65) Prior Publication Data
US 2009/0214160 A1   Aug. 27, 2009
US 2010/0008623 A2   Jan. 14, 2010

(30) Foreign Application Priority Data
Nov. 17, 2004   (WO) ............... PCT/IL2004/001058

(51) Int. Cl.
*G02B 6/26* (2006.01)
*H04J 14/00* (2006.01)

(52) U.S. Cl. ............... 385/17; 385/15; 385/16; 385/18; 385/52; 385/88; 385/89; 398/50; 398/56

(58) Field of Classification Search ............ 385/15, 385/16, 17, 18, 24, 52, 134, 135, 136, 137, 385/138, 88, 89, 92; 398/50, 56, 57
See application file for complete search history.

(56) References Cited

U.S. PATENT DOCUMENTS 4,953,155 A * 8/1990 Tangonan et al. ............. 398/55

(Continued)

FOREIGN PATENT DOCUMENTS

| EP | 0567143 | 10/1993 |
| JP | 04361205 | 12/1992 |
| JP | 2002258065 | 9/2002 |
| WO | WO 0243432 | 5/2002 |

OTHER PUBLICATIONS

International Search Report, PCT/IL2005/001220, Apr. 19, 2006.

*Primary Examiner*—Brian M Healy
(74) *Attorney, Agent, or Firm*—Allan C. Entis; Intellectual Property Ltd.

(57) ABSTRACT

An optical crossbar switch for optically coupling optic fibers comprising: at least one first fiber (21) and a plurality of second fibers (22); a moveable fiber-end carriage (41) coupled to an end of the at least one first fiber and constrained to move along a predetermined trajectory; at least one moveable slack-control carriage (42) coupled to the body of the at least one first fiber and constrained to move along a predetermined trajectory; and at least one moving device (70, 80) controllable to move the carriages; wherein to optically couple a first fiber of the at least one first fiber to a second fiber of the plurality of second fibers, the at least one moving device moves the fiber-end carriage of the first fiber along its trajectory to a position at which the end of the first fiber is optically coupled to an end of the second fiber and moves the at least one slack-control carriage to take up slack in the first fiber generated by movement of its fiber-end carriage.

55 Claims, 20 Drawing Sheets

U.S. PATENT DOCUMENTS

| | | | |
|---|---|---|---|
| 5,337,378 A * | 8/1994 | Saito et al. | 385/16 |
| 5,613,021 A | 3/1997 | Saito et al. | 385/17 |
| 5,754,320 A * | 5/1998 | Watanabe et al. | 398/50 |
| 6,243,178 B1 * | 6/2001 | Suemura et al. | 398/56 |
| 6,690,851 B1 * | 2/2004 | Guilfoyle | 385/18 |
| 2002/0102046 A1 * | 8/2002 | Newberg et al. | 385/17 |
| 2003/0059154 A1 | 3/2003 | Sato | 385/17 |
| 2009/0214160 A1 * | 8/2009 | Arol et al. | 385/17 |

* cited by examiner

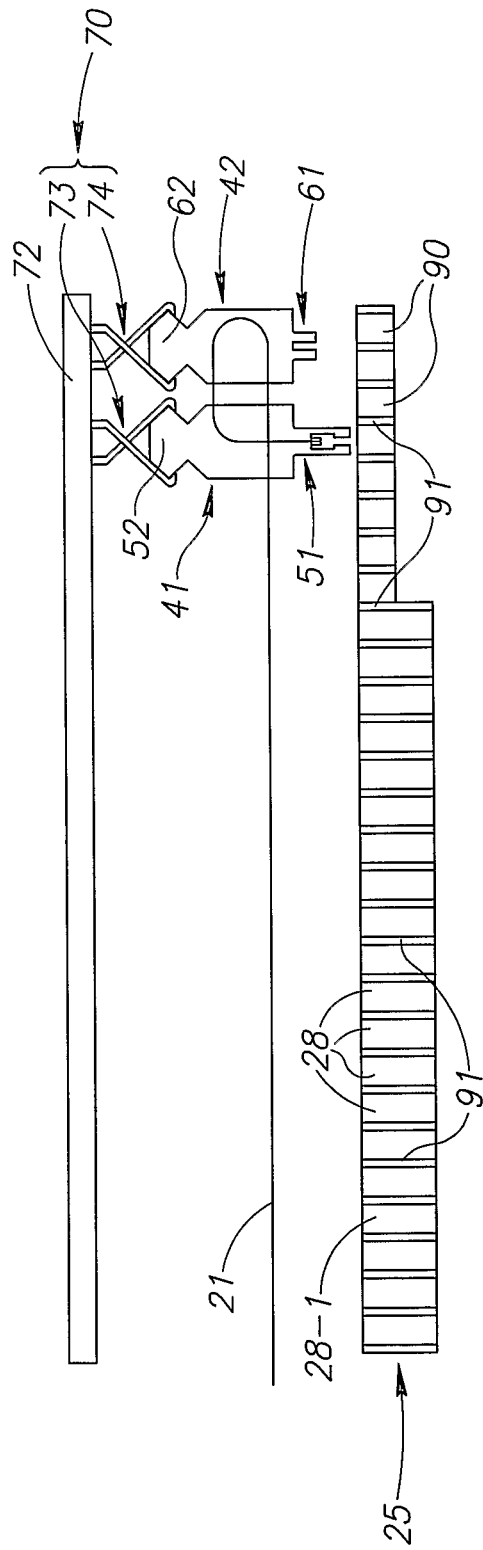
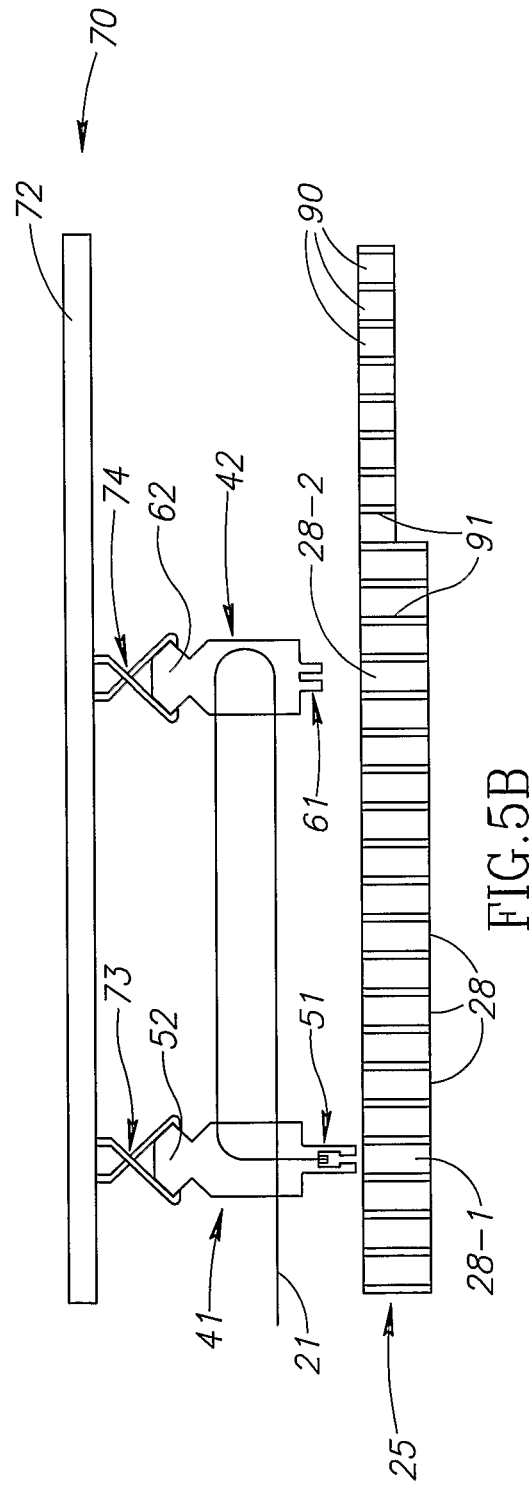
FIG.5A
FIG.5B

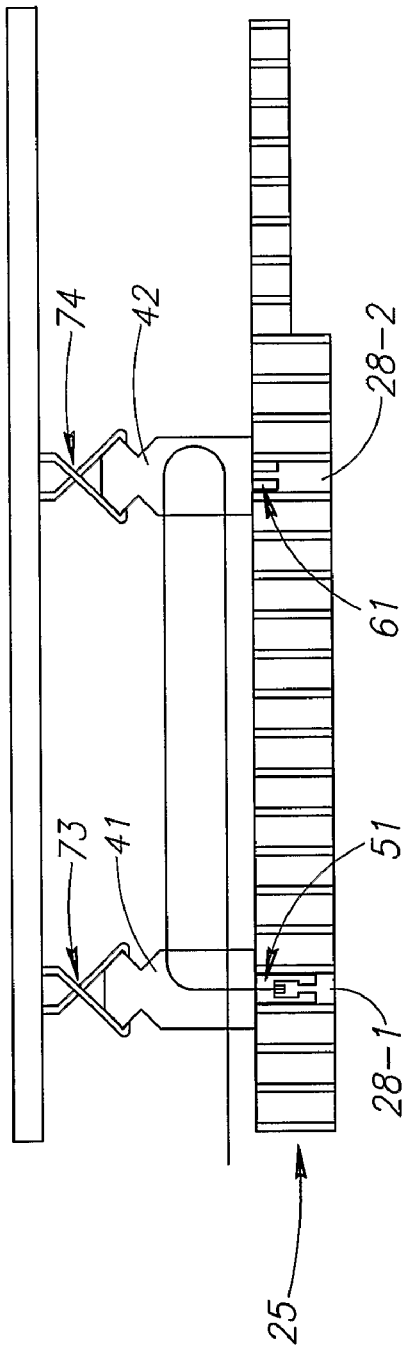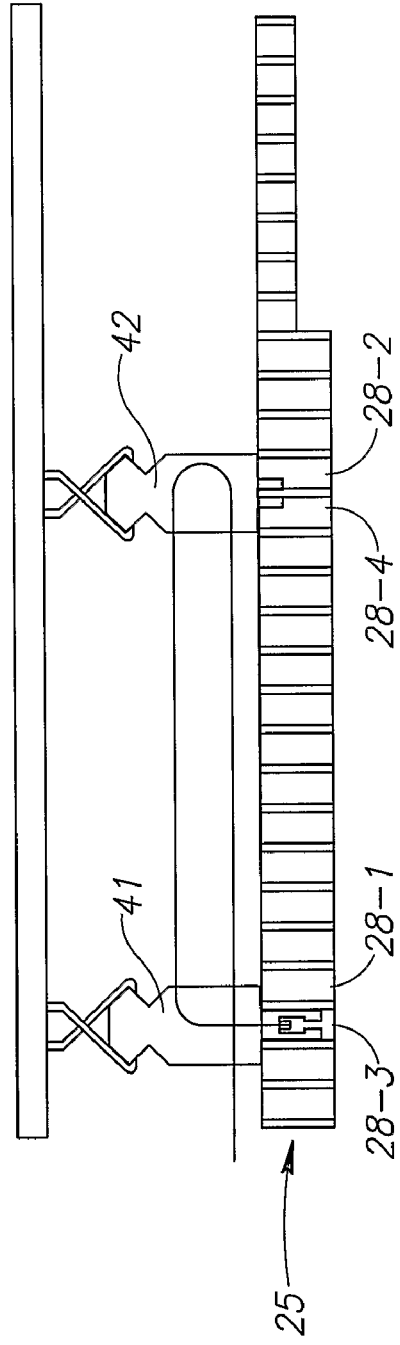

OPTICAL CROSSBAR SWITCH

RELATED APPLICATIONS

The present application is a US National Phase of PCT Application No. PCT/IL2005/001220, flied on Nov. 17, 2005, which claims the benefit of PCT/IL2004/001058 filed on Nov. 17, 2004 entitled "Optical Crossbar Switch", the disclosures of which are incorporated herein by reference.

FIELD OF THE INVENTION

The invention relates to crossbar switches and in particular to optical crossbar switches.

BACKGROUND OF THE INVENTION

A crossbar switch generally operates to connect any one of a first plurality of signal ports to any one of a second plurality of signal ports. Generally, signal ports in the first and second pluralities of signal ports are bi-directional and any of the first or second ports in the crossbar switch can be used to both receive and transmit signals. The crossbar switch operates as a router that routes a signal received on any one of its ports in the first or second plurality of ports to a desired port of the other of the first and second plurality of ports from which the signal is transmitted. Crossbar switches are typically used, for example, for routing signals in communication networks such as LANs, WANs, and telecommunication networks and in routing data signals between processors comprised in parallel data processing systems.

In many communication networks, signals are optical signals that are transmitted along optic fibers and routing is accomplished by optical crossbar switches. A first plurality of signal ports are ends of a first plurality of optic fibers and a second plurality of signal ports are ends of a second plurality of fibers. The crossbar switch operates to optically couple an end of a given fiber of the first plurality of optic fibers to an end of a given fiber of the second plurality of optic fibers, to provide a desired connection.

Optical crossbar switches are often required to accommodate very large numbers of optic fibers. As the number of fibers increases, the task of efficiently managing connecting and disconnecting large numbers of optic fiber ends without fibers becoming entangled becomes increasingly complex. Prior art crossbar switches for optically coupling and uncoupling large numbers of optic fibers tend to be complicated, unwieldy pieces of equipment that require relatively large volumes of operating space to accommodate the coupling and uncoupling operations.

U.S. Pat. No. 5,613,021, the disclosure of which is incorporated herein by reference, describes an optical crossbar switch in which a robot hand connects and disconnects ends of a plurality of first fibers to ends of a plurality of second fibers, which second fibers have their ends held stationary in a rectangular array in a coupling board. As an end of a fiber in the first plurality of fibers is connected or disconnected to an end of a fiber in the second plurality of fibers, length of the first fiber is respectively played out or "reeled in" by a fiber length adjusting unit which requires its own significant space volume. The robot hand "mimics" the way in which a human switch board operator operates a telephone switch board, plugging and unplugging telephone cables from a switch board. During operation of the switch, first optic fibers cross each other as they are connected and unconnected from different second optic fibers. In an embodiment of the invention, the adjusting unit comprises a pair of rotatable reels on which surplus portions of the first fiber are wound. The reels are spring loaded to urge them apart and take up slack in the fiber wound between them.

U.S. Pat. No. 6,307,983, the disclosure of which is incorporated herein by reference, describes an optical crossbar switch in which patch fibers are used to connect ends of a plurality of first fibers to ends of a plurality of second fibers. A first end of each of the patch fibers is connected to an end of a first fiber. The ends of the second fibers are mounted to a circular holding ring. The second ends of the patch fibers are mounted to a linear conveyor. The conveyor sequentially loads the second end of each patch fiber at a different desired loading location on the perimeter of a "loader ring", which is coaxial with the holding ring that holds the ends of the second fibers and has a same diameter as the holding ring. The second end of a patch fiber is loaded to the desired location on the loader ring by suitably rotating the loader ring about the axis of rotation and translating the linear conveyor so that the position of the second end of the patch fiber on the linear conveyor meets the desired location on the loader ring perimeter. After the loading ring is loaded with the second ends of the patch fibers, the loading ring is translated along the common axis it shares with the holding ring to "dock" the second ends of the patch fibers with the ends of the second fibers. A configuration of connections between the first and second pluralities of fibers is determined by the positions of the patch fiber second ends on the loader ring and an azimuth angle of the loader ring relative to the holding ring.

PCT publication WO 02/43432, the disclosure of which is incorporated herein by reference, describes an optical crossbar switch in which any given one of a plurality of first optic fibers is optically coupled to any given one of a plurality of second optical fibers by translating the ends of the given fibers along different linear trajectories.

SUMMARY OF THE INVENTION

An aspect of some embodiments of the present invention relates to providing an improved optical crossbar switch that provides for efficient management of the coupling and uncoupling of relatively large numbers of optic fibers in a relatively small volume of space.

An aspect of some embodiments of the invention relates to providing an optical crossbar switch wherein large numbers of optic fibers may be coupled and uncoupled without the fibers becoming entangled.

An aspect of some embodiments of the invention relates to providing an optical crossbar switch for optically coupling and uncoupling optical fibers wherein substantially no slack is generated in optic fibers during the process of optically coupling and uncoupling fibers.

In accordance with an embodiment of the invention, an optical crossbar switch comprises first and second pluralities of respectively first and second optic fibers. Each fiber is coupled to a different pair of moveable "fiber-end" and "slack-control" carriages. The fiber-end carriage of the pair is coupled to an optical end, hereinafter a "switch end", of the fiber and the slack-control carriage is coupled to the body of the fiber. The crossbar switch comprises at least one device, hereinafter "a mover", controllable to move the fiber-end carriage of each of the fibers so as to optically couple the switch end of any first fiber to the switch end of any second fiber by positioning the ends opposite to and facing each other. When moving the fiber-end carriage of a fiber, the at least one mover moves the slack-control carriage of the fiber to take up slack in the fiber generated by motion of the fiber-end carriage or to "reel out" a length of fiber required to enable free motion of the fiber-end carriage.

In some embodiments of the invention, a same mover is used to move the fiber-end and slack-control carriages of a plurality of different first or second fibers. Optionally, the mover comprises two grabbers, which are controllable to substantially simultaneously grab the fiber-end and slack-control carriages of a first or second fiber and move them in accordance with an embodiment of the invention to couple the fiber to a second or first fiber respectively. In some embodiments of the invention, each fiber comprises its own exclusive mover. Optionally, the exclusive mover comprises a different motor for each of the fiber's fiber-end and slack-control carriages controllable to move the carriage.

In accordance with an embodiment of the invention, the at least one mover moves each of the fiber-end carriages of the first fibers along different, optionally straight-line, first trajectories. Optionally, the first trajectories are parallel and coplanar. Similarly, the at least one mover moves each of the fiber-end carriages of the second fibers along different, optionally straight-line, second trajectories. Optionally, the second trajectories are parallel and coplanar. Optionally, the planes of the first and second trajectories are parallel. A projection of each of the first trajectories on the plane of the second trajectories intersects each of the second trajectories. Optionally, the projection of a first fiber is perpendicular to the second trajectories. A point at which the projection of a first trajectory crosses over a second trajectory is referred to as a "crossover point" of the first and second trajectories, or alternatively, a crossover point of the first and second fibers associated with the trajectories.

To optically couple any given first fiber to any given second fiber, the at least one mover moves the fiber-end carriage of each of the given fibers to position the switch ends of the fibers facing their common crossover point. A minimum dynamic range of motion, hereinafter a minimum dynamic "coupling range", of a fiber-end carriage of a given first fiber sufficient to enable the first fiber to be coupled to any one of the second fibers, is substantially equal to a maximum distance between crossover points along the fiber's trajectory.

In an embodiment of the invention, the at least one mover moves the slack-control carriage of each optic fiber along a same trajectory along which it moves the fiber's fiber-end carriage in order to take up slack in the fiber or reel out fiber length. Optionally, the slack-control carriage operates like a moveable pulley relative to the fiber-end carriage. The fiber is threaded into and out of the slack-control carriage looping through at least one, optionally "U" shaped channel formed in the slack-control carriage or around a configuration of at least one pulley wheel comprised in the slack-control carriage. The at least one channel or pulley wheel configures the fiber so that, optionally, at least two lengths of the fiber lie between the fiber-end and slack-control carriages. In accordance with an embodiment of the invention, the at least one mover moves the slack-control carriage one half a distance that it moves the fiber-end carriage to increase or decrease the two lengths of the fiber in order to respectively take up or reel out fiber as needed. For such an embodiment, a minimum dynamic range of motion, referred to as a minimum dynamic "take-up range", for a given slack-control carriage is substantially equal to one-half the minimum dynamic coupling range of its associated fiber-end carriage.

In some embodiments of the invention, the fiber-end and slack-control carriages of an optic fiber are configured so that more than two lengths of a fiber lie between the fiber-end and slack-control carriages. For a given distance that the fiber-end carriage moves, the slack-control carriage moves a distance equal to about the given "fiber-end" distance divided by the number of fiber lengths that lie between the carriages to take up slack or reel out fiber. For example, in an embodiment of the invention, four fiber lengths lie between a given fiber-end carriage and its associated slack-control carriage. In such an embodiment the slack-control carriage moves about one-fourth the distance that the fiber-end carriage moves and a minimum dynamic take-up range of the slack-control carriage is one-fourth the coupling range of the fiber-end carriage.

Optionally, to optically couple a first and a second fiber, subsequent to moving the switch ends of the fibers to their crossover point, the at least one mover moves the switch ends towards each other so that they are relatively close or substantially contiguous. Optionally, the crossbar switch comprises a "honeycomb" array of sockets located between the planes of the first and second trajectories. The socket array comprises a different socket for each fiber crossover point located in the neighborhood of the crossover point. To optically couple a given first fiber to a given second fiber, the at least one mover translates the switch end of the given fibers to their crossover point and inserts the switch end of each of the fibers into the socket.

In some embodiments of the invention, the socket functions to aid alignment of the switch ends. In some embodiments of the invention, the socket alternatively or additionally provides mechanical support for the coupled switch ends. Optionally, the socket provides mechanical support for the fiber-end carriages to which the switch ends are mounted and mechanically supports the carriages in positions that maintain the switch ends optically coupled.

In accordance with an embodiment of the invention, the crossbar switch is configured so that the first and second trajectories are arrayed with relatively small pitches and the dynamic coupling ranges and take-up ranges of the fiber-end and slack-control carriages are substantially equal to their respective minimum ranges. Optionally, to enable the relatively small pitches, the carriages are substantially planar structures having a relatively small thickness perpendicular to the trajectories along which they move. As a result, a relatively large number of first and second fibers can be accommodated by the crossbar switch and efficiently optically coupled and uncoupled in a relatively small volume. In addition, because the carriages associated with a given fiber move along a trajectory that is different from that of the other fibers, none of the first trajectories cross each other and none of the second trajectories cross each other and fibers don't tangle during operation of the switch.

In some embodiments of the invention, an optical crossbar switch comprises at least one patch fiber that is used to optically couple any first fiber of a plurality of "signal" fibers to any second fiber of the plurality of signal fibers. A first and a second fiber of the plurality of signal fibers are optically coupled by optically coupling their respective switch ends to different "patch" ends of a same patch fiber of the at least one patch fibers.

Each of the plurality of signal fibers is optionally coupled to a fiber-end and a slack-control carriage that move along a signal fiber trajectory to position the switch end of the signal fiber along the trajectory without generating substantial slack in the signal fiber. A first patch end of each patch fiber is mounted to a first fiber-end carriage and a second patch end of the patch fiber is mounted to a second fiber-end carriage. Each of the fiber-end carriages is moveable along an optionally same patch fiber trajectory that has a crossover point with the trajectory of each of the signal fibers.

To optically couple a first signal fiber with a second signal fiber, the switch ends of the signal fibers are moved to first and second crossover points respectively of the signal fibers with a same patch fiber of the at least one patch fiber. At the first crossover point the first fiber-end carriage of the patch fiber is moved to align the first patch end of the patch fiber facing the switch end of the first signal fiber so that optical signals may be transmitted between the first signal fiber and the patch fiber. Similarly, at the second crossover point the second fiber-end carriage of the patch fiber is moved to align the second patch end of the patch fiber facing the switch end of the second signal fiber so that optical signals may be transmitted between the second signal fiber and the patch fiber.

There is therefore provided, in accordance with an embodiment of the present invention, an optical crossbar switch for optically coupling optic fibers comprising: at least one first fiber and a plurality of second fibers; a moveable fiber-end carriage coupled to an end of the at least one first fiber and constrained to move along a predetermined trajectory; at least one moveable slack-control carriage coupled to the body of the at least one first fiber and constrained to move along a predetermined trajectory; and at least one moving device controllable to move the carriages; wherein to optically couple a first fiber of the at least one first fiber to a second fiber of the plurality of second fibers, the at least one moving device moves the fiber-end carriage of the first fiber along its trajectory to a position at which the end of the first fiber is optically coupled to an end of the second fiber and moves the at least one slack-control carriage to take up slack in the first fiber generated by movement of its fiber-end carriage.

Optionally, both ends of a first fiber are coupled to different fiber-end carriages moveable along predetermined trajectories and the at least one moving device moves the carriages to positions at which the ends of the first fiber are optically coupled to ends of different second fibers to optically couple the second fibers to each other. Alternatively or additionally, the at least one slack-control carriage comprises two slack control carriages.

In an embodiment of the invention, to optically couple the first fiber to a second fiber the at least one moving device moves the fiber-end carriage of the first fiber to align the end of the first fiber facing the end of the second fiber.

In an embodiment of the invention, ends of the second fibers are located at fixed positions.

In some embodiments of the invention, the crossbar switch comprises a moveable fiber-end carriage coupled to the end of each second fiber and a moveable slack-control carriage coupled to the body of each second fiber, which carriages are constrained to move along predetermined trajectories. Optionally to couple a first fiber to a second fiber, the at least one moving device moves the fiber-end carriage of the second fiber to align the end of the second fiber facing the end of the first fiber. Additionally or alternatively a projection of the trajectory of each fiber-end carriage of the at least one first fiber crosses the trajectories of the fiber-end carriages of all the second fibers.

In some embodiments of the invention, the projection of the trajectory of the fiber-end carriage of a first fiber is perpendicular to the trajectories of the fiber-end carriages of the second fibers that it crosses.

In some embodiments of the invention, the trajectories of the fiber-end carriages of the second fibers are parallel.

In some embodiments of the invention, the trajectories of the fiber-end carriages of the second fibers are coplanar.

In some embodiments of the invention, the at least one first fiber comprises a plurality of first fibers. Optionally, the trajectories of the fiber-end carriages of the first fibers are parallel. Additionally or alternatively, the trajectories of the fiber-end carriages of the first fibers are optionally coplanar. Additionally or alternatively, optionally, the trajectories of the fiber-end carriages of the first fibers are coplanar and the trajectories of the fiber-end carriages of the second fibers are coplanar and the planes of the trajectories are parallel.

In some embodiments of the invention, the trajectories of the fiber-end carriages are straight-line trajectories.

In some embodiments of the invention, the trajectories of the slack-control carriages are straight-line trajectories.

In some embodiments of the invention, the fiber-end and slack-control carriages associated with a same fiber move along a substantially same trajectory.

In some embodiments of the invention, for a given fiber coupled to a fiber-end carriage and at least one slack-control carriage at least two lengths of the fiber body extend between the fiber-end carriage and a slack-control carriage of the at least one slack-control carriage and a section of the fiber body coupled to the at least one slack-control carriage is free to move along its length. Optionally, a slack-control carriage of the at least one slack-control carriage is formed with a channel and the section of the fiber body is threaded through the channel. Additionally or alternatively, a slack-control carriage of the at least one carriage is optionally formed with a groove along which the section of the fiber lies. Additionally or alternatively, a slack-control carriage of the at least one slack-control carriage optionally comprises a pulley wheel and the fiber body loops around a region of the rim of the pulley wheel.

In some embodiments of the invention, the at least one moving device for moving carriages comprises at least two grabbers controllable to simultaneously grab the fiber-end carriage and the at least one slack-control carriage of a fiber. Optionally, the grabbers are controllable to simultaneously move the fiber-end carriage and the at least one slack-control carriage of the fiber along their respective trajectories.

In some embodiments of the invention, the at least one moving device for moving the carriages comprises a motor for each carriage controllable to move the carriage along its trajectory.

In some embodiments of the invention, each carriage is mounted to a guide rail along which the carriage moves.

An optical crossbar switch according to any of the preceding claims and comprising an array of sockets and wherein to optically couple a first fiber to a second fiber, the at least one moving device moves the fiber-end carriage of at least one of the first and second fibers to a socket and inserts the fiber's fiber end into the socket. Optionally, the socket provides support for maintaining the fiber-end carriage in a position that provides optical contact of the fibers.

In some embodiments of the invention, the fiber-end carriage of a fiber comprises a light director controllable to direct light that exits the end of the fiber so that the light is incident on the end of another fiber.

Optionally, the light director is controllable to deflect light that exits the fiber selectively along different directions. Alternatively or additionally, the light director is optionally controllable not to deflect light that exits the fiber. Additionally or alternatively the light director optionally comprises a light pipe. Additionally or alternatively, the light director optionally comprises an optical switch controllable to direct light along different directions. Optionally, the optical switch is controlled electronically. Additionally or alternatively, the optical switch is optionally controlled acoustically.

BRIEF DESCRIPTION OF FIGURES

A description of examples of embodiments of the present invention that references figures attached hereto is given below. In the figures, identical structures, elements or parts that appear in more than one figure are generally labeled with the same numeral in all the figures in which they appear. Dimensions of components and features shown in the figures are chosen for convenience and clarity of presentation and are not necessarily shown to scale. The figures are listed below.

FIGS. 5A-5D schematically illustrate motion of a fiber-end and a slack-control carriage coupled to a fiber that provides for free motion of the fiber-end carriage without generating slack in the fiber, in accordance with an embodiment of the invention;

DETAILED DESCRIPTION OF EXAMPLES OF EMBODIMENTS

Figure 1:
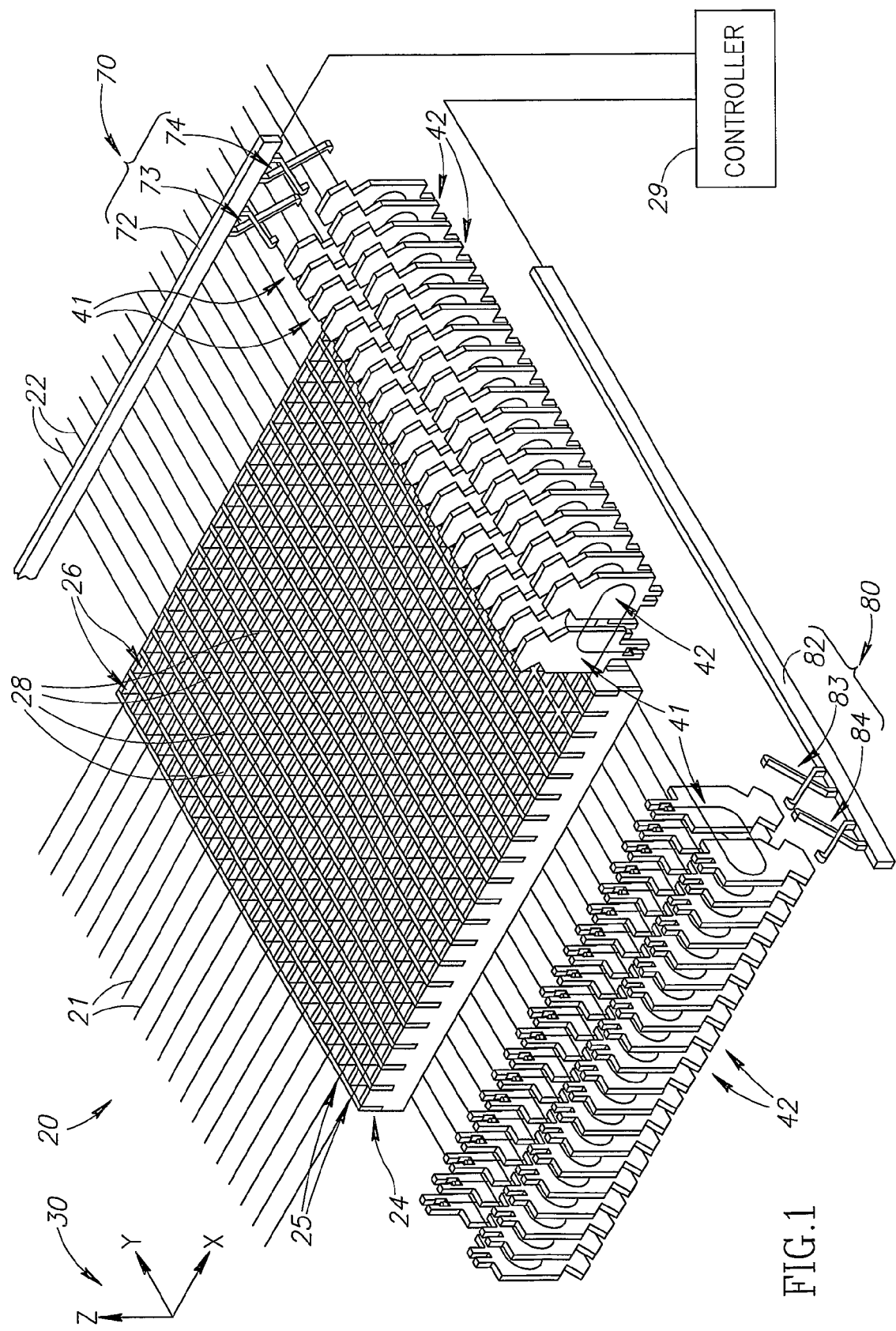
FIG. 1 schematically shows an optical crossbar switch, in accordance with an embodiment of the present invention.

FIG. 1 schematically shows an optical crossbar switch 20, in accordance with an embodiment of the present invention. Crossbar switch 20 comprises a first plurality of optic fibers 21, hereinafter referred to as "top optic fibers" 21, and a second plurality of optic fibers 22, hereinafter referred to as "bottom optic fibers" 22. Optionally, within switch 20, top fibers 21 are coplanar and perpendicular to bottom fibers 22, which are optionally coplanar. Each optic fiber 21 and 22 is mounted to a fiber-end carriage 41 and a slack-control carriage 42, and is shown in FIG. 1 without obstruction by appurtenances that might be used to couple the fiber to the carriages in order to more clearly illustrate how the fiber is spatially configured, in accordance with an embodiment of the invention.

Optionally, crossbar switch 20 comprises a rectangular honeycomb array 24 of columns 25 and rows 26 of sockets 28 located between the plane of top fibers 21 and the plane of bottom fibers 22. In an embodiment of the invention, each top fiber 21 extends along a different column 25 of sockets 28 and each bottom fiber 22 extends along a different row 26 of the sockets. A controller 29 controls crossbar switch 20 to optically couple any given one of top optic fibers 21 to any given one of bottom optic fibers 22 by inserting fiber-end carriages of the given top and bottom fibers into a same socket 28. The socket optionally aids in aligning the optic fibers and provides mechanical support for maintaining the fiber-end carriages in positions that provide optical contact of the fibers. In FIG. 1, none of top fibers 21 is connected to a bottom fiber 22 and all carriages 41 and 42 are in "parking positions" along the sides of socket array 24. In parking positions, fiber-end and slack-control carriages 41 and 42 are optionally supported in parking sockets, which, to prevent clutter, are not shown in FIG. 1. Parking sockets are discussed below.

For convenience of presentation, positions and orientations of components and elements of crossbar switch 20 are referenced with respect to a coordinate system 30. Rows 26 and columns 25 are parallel respectively to the x and y-axis of coordinate system 30. To prevent clutter, only some of identical features of crossbar switch 20 are labeled with reference numerals.

Figure 2:
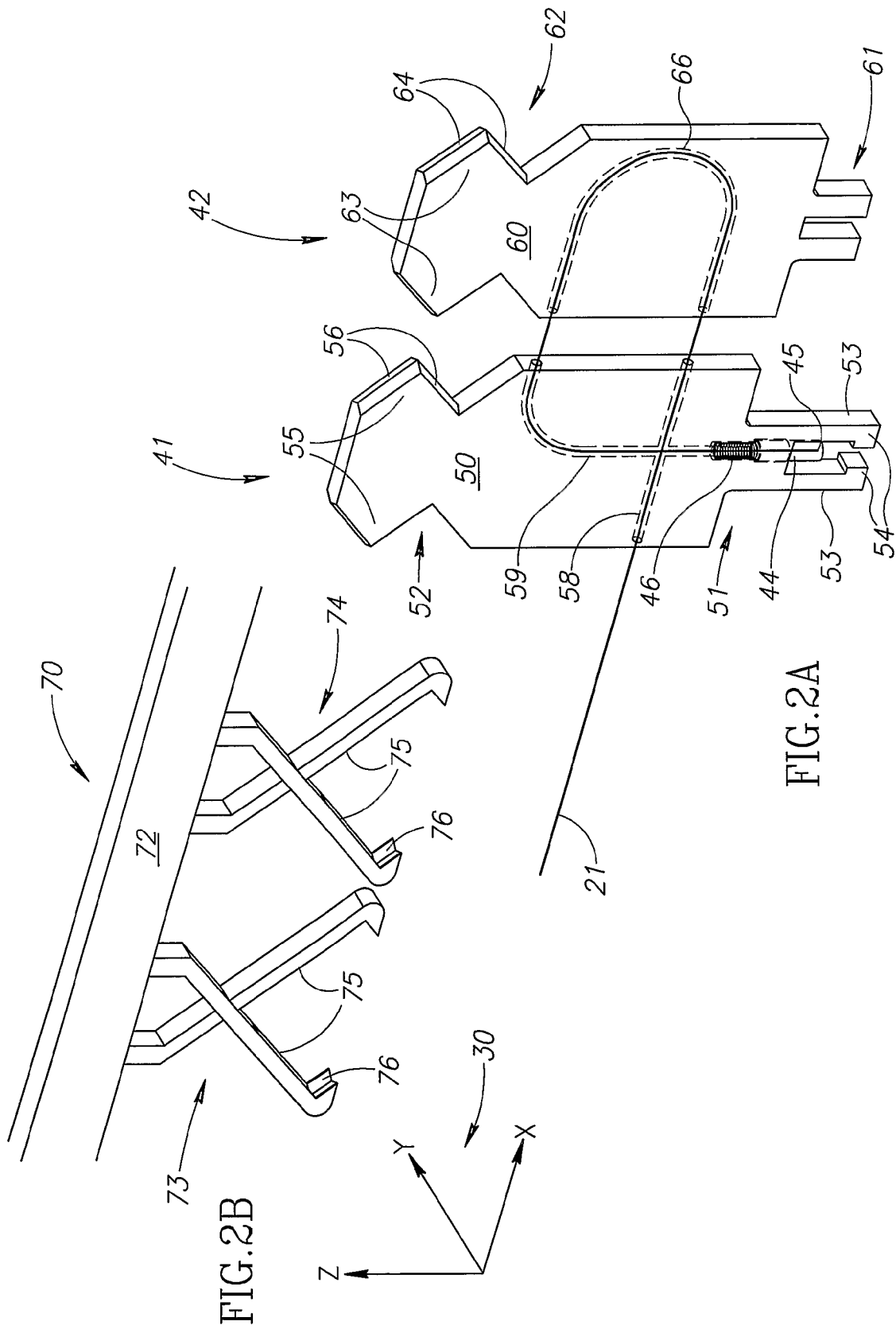
FIG. 2A schematically shows details of an optical fiber comprised in the optical crossbar switch shown in FIG. 1 coupled to a fiber-end and slack-control carriage, in accordance with an embodiment of the present invention.
FIG. 2B schematically shows a portion of a mover comprised in the optical crossbar switch shown in FIG. 1 and grabbers mounted to the mover, in accordance with an embodiment of the present invention.

FIG. 2A schematically shows details of a fiber 21, its fiber-end and slack-control carriages 41 and 42 and the way the fiber is mounted to the carriages. Internal features of the carriages germane to the discussion, which would normally be hidden from view in the perspective of the figure, are generally shown in dashed lines. The fibers themselves are shown as solid lines, even when hidden from view, for clarity of presentation. Bottom fibers 22 are optionally mounted to their fiber-end and slack-control carriages 41 and 42 similarly to the way in which top fibers 21 are mounted to their carriages. The discussion of the way in which a top fiber 21 is mounted to its carriages applies equally well to the way in which a bottom fiber 22 is mounted to its carriages.

Fiber-end carriage 41 optionally comprises a flat plate 50 having a socket prong 51 and a carrying handle 52. Optionally, socket prong 51 comprises two alignment tines 53, each having a tooth 54. Optionally, carrying handle 52 comprises two "V" shaped gripping protrusions 55, each formed by beveled edges 56. Plate 50 is optionally formed to have a "transfer" channel 58 and a "cross" channel 59 through which fiber 21 is threaded. Slack-control carriage 42 optionally comprises a flat plate 60 having a bifurcated socket prong 61 and a carrying handle 62. Optionally, carrying handle 62 comprises two V shaped gripping protrusions 63, each formed by beveled edges 64. Optionally, handles 52 and 62 are identical. Optionally, slack-control carriage 60 is formed to have a single "U" shaped "return" channel 66 through which fiber 21 is threaded.

Fiber 21 is threaded through transfer channel 58 in its fiber-end carriage 41 so that it passes through the fiber-end carriage and enters return channel 66 in slack-control carriage 42. Return channel 66 returns the fiber back to fiber-end carriage 41 where it is received by cross channel 59. Cross channel 59 optionally intersects transfer channel 58 and directs fiber 21 so that it crosses a portion of the fiber threaded through transfer channel 58 and continues on to a coupling nub 44 to which an end 45, i.e. a "switch end", of the fiber is anchored. Optionally, coupling nub 44 protrudes from socket prong 51 and is spring loaded, optionally by a spring 46, so that it is resiliently pressed to extend from the socket prong. A suitable stop (not shown) prevents spring 46 from ejecting nub 44 from socket prong 51. Channels 55 and 56 in fiber-end carriage 41 and channel 64 in slack-control carriage 42 are formed using any of various methods and devices known in the art, so that fiber 21 is free to move easily along the channels.

It is noted, it is possible to configure channels differently from the manner in which they are configured in FIG. 2A. For example, transfer channel 58 in fiber-end carriage 41 could be positioned opposite the top end of U shaped return channel 66 in slack-control carriage 42 rather than opposite the bottom end of the return channel. In such a configuration, an optic fiber threaded through the transfer channel and return channel 66 back to fiber-end carriage 41 would optionally not be received by cross-channel 59, but by a channel that does not cross the transfer channel. The optic fiber would not cross itself in the fiber-end carriage.

Optionally, crossbar switch 20 comprises a top mover 70 as shown in FIG. 1, for moving and positioning fiber-end and slack-control carriages 41 and 42 of any given top fiber 21 along column 25 of sockets 28 associated with the given top fiber. In FIG. 1 top mover 70 is shown in a parking position in which it is located along an edge of socket array 24 and is not grasping any carriage 41 or 42.

Optionally, top mover 70 comprises a carrier beam 72, and identical fiber-end and slack-control carriage grabbers 73 and 74 respectively. A portion of carrier beam 72 and grabbers 73 and 74 are shown enlarged in FIG. 2B. Each grabber 73 and 74 optionally comprises a pair of opposed tongs 75 shaped to receive a gripping protrusion 55 or 63 of carrying handle 52 or 62 respectively and having a groove 76 shaped to match the bevel shape of edges 56 or 64 of the gripping protrusion. Carrier beam 70 is supported by a suitable structure (not shown) that maintains the beam parallel to the x-axis and is controllable by controller 29 to move the carrier beam parallel to the y-axis so as to align the beam over and parallel to any column 25 (FIG. 1) of sockets 28.

Each grabber 73 and 74 is controllable to be moved along beam 72, i.e. along the x-direction and up and down along the z-direction. Tongs 75 of the grabber are controllable to be spread apart and closed toward each other to grasp, hold and release a carrying handle 52 or 62 as required. Once top mover 70 is aligned over a column 25 of sockets 28, each grabber 73 and 74 is therefore controllable to grasp a carriage 41 or 42 of top fiber 21 associated with the column by its handle, move the carriage along the column of sockets and insert the carriage's socket prong 51 into any one of the sockets in the column.

The bevel shape of edges 56 and 64 and matching grooves 76 of tongs 75 of a grabber 73 or 74 assure alignment of the tongs with V-protrusions 55 or 63 of a carriage carrier handle 52 or 62 when the grabber is used to grasp the carriage. The matching bevel edges 56 or 64 and grooves 76 also tend to promote stability of coupling between a grabber 73 or 74 and a carriage when carrying handle 52 or 62 is grasped by the grabber and tends to prevent the handle from slipping out from the grasp of the grabber.

Optionally, crossbar switch 20 comprises a bottom mover 80 (FIG. 1) for moving carriages 41 and 42 associated with bottom optic fibers 22. Optionally, bottom mover 80 comprises a beam 82 and grabbers 83 and 84 and is similar to and operates similarly to top mover 70 except that its beam 82 is parallel to the y-axis and moveable along the x-axis.

Controller 29 controls crossbar switch 20 to optically couple any given one of top fibers 21 to any given one of bottom fibers 22 by controlling top and bottom movers 70 and 80 to move the respective fiber-end carriages 41 of the given fibers to a socket 28 at their common crossover point and to insert their respective socket prongs 51 into the socket.

Figure 3:
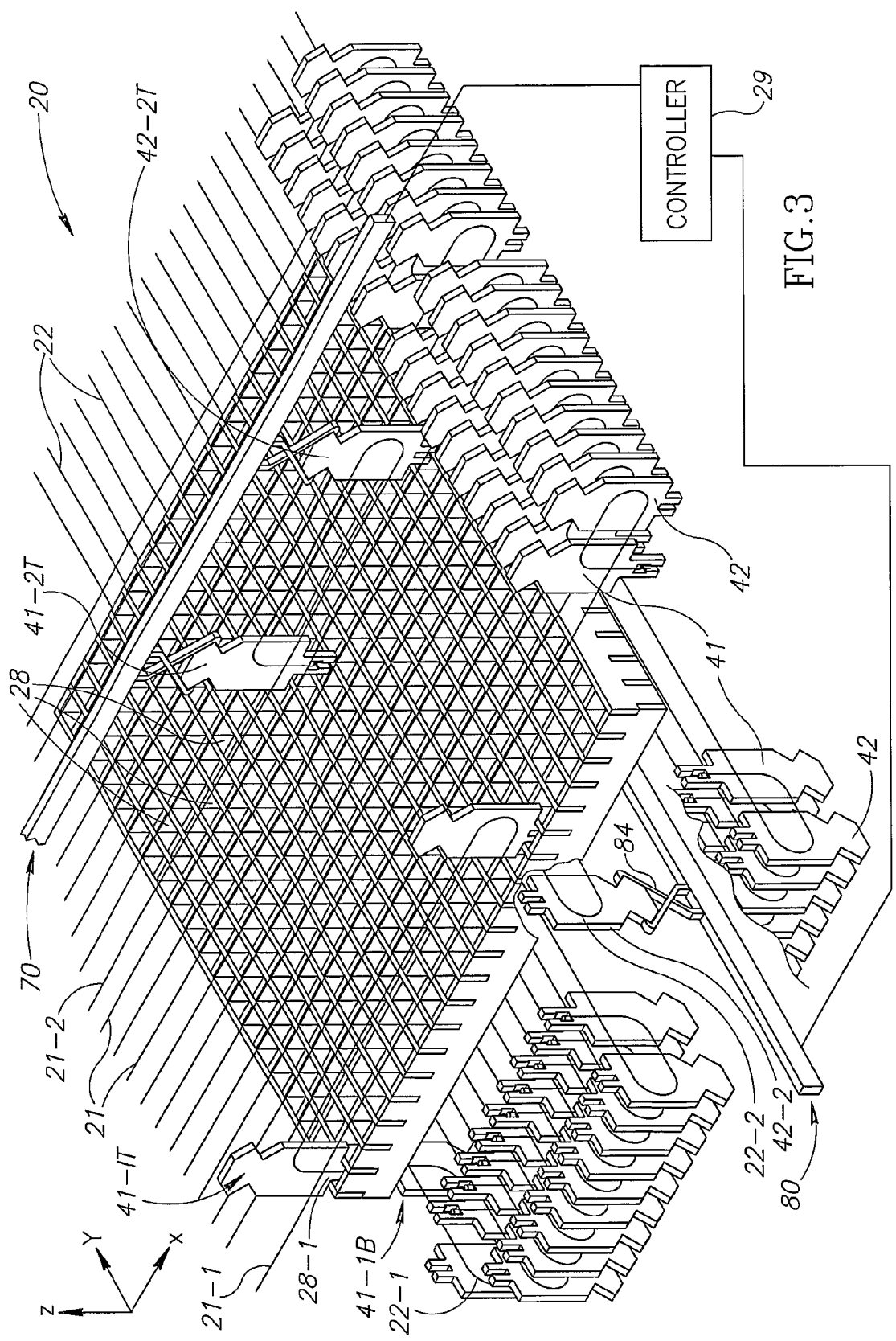
FIG. 3 schematically shows top and bottom fibers in the crossbar switch shown in FIG. 1 in which some fibers are optical coupled and some fibers are in the process of being optically coupled, in accordance with an embodiment of the present invention.

FIG. 3 schematically shows crossbar switch 20 after controller 29 has controlled top and bottom movers 70 and 80 to optically couple a top fiber 21 labeled 21-1 to a bottom fiber 22 labeled 22-1. Fiber-end carriage 41 of top fiber 21-1, indicated by alphanumeric 41-1T, and fiber-end carriage 41 of bottom fiber 22-1, indicated by alphanumeric 41-1B, are inserted into a common socket 28 labeled 28-1.

FIG. 3 also schematically shows controller 29 controlling top and bottom movers 70 and 80 to optically couple top and bottom fibers 21 and 22 labeled respectively by alphanumerics 21-2 and 22-2. Top mover 70 is shown moving fiber-end and slack-control carriages of top fiber 21-2, which are labeled 41-2T and 42-2T respectively, so as to couple the fiber to bottom fiber 22-2. Carriages 41-2T and 42-2T are shown just prior to being inserted into appropriate sockets 28. Portions of crossbar switch 20 are cutaway to show a portion of bottom mover 80 being controlled to couple bottom fiber 22-2 to top fiber 21-2. In the portion of mover 80 shown in FIG. 3, grabber 84 is shown grasping and moving slack-control carriage 42, labeled 42-2, of bottom fiber 22-2. Grabber 82 (FIG. 1), which is moving fiber-end carriage 41 of the fiber, is not seen in the figure.

Figure 4:
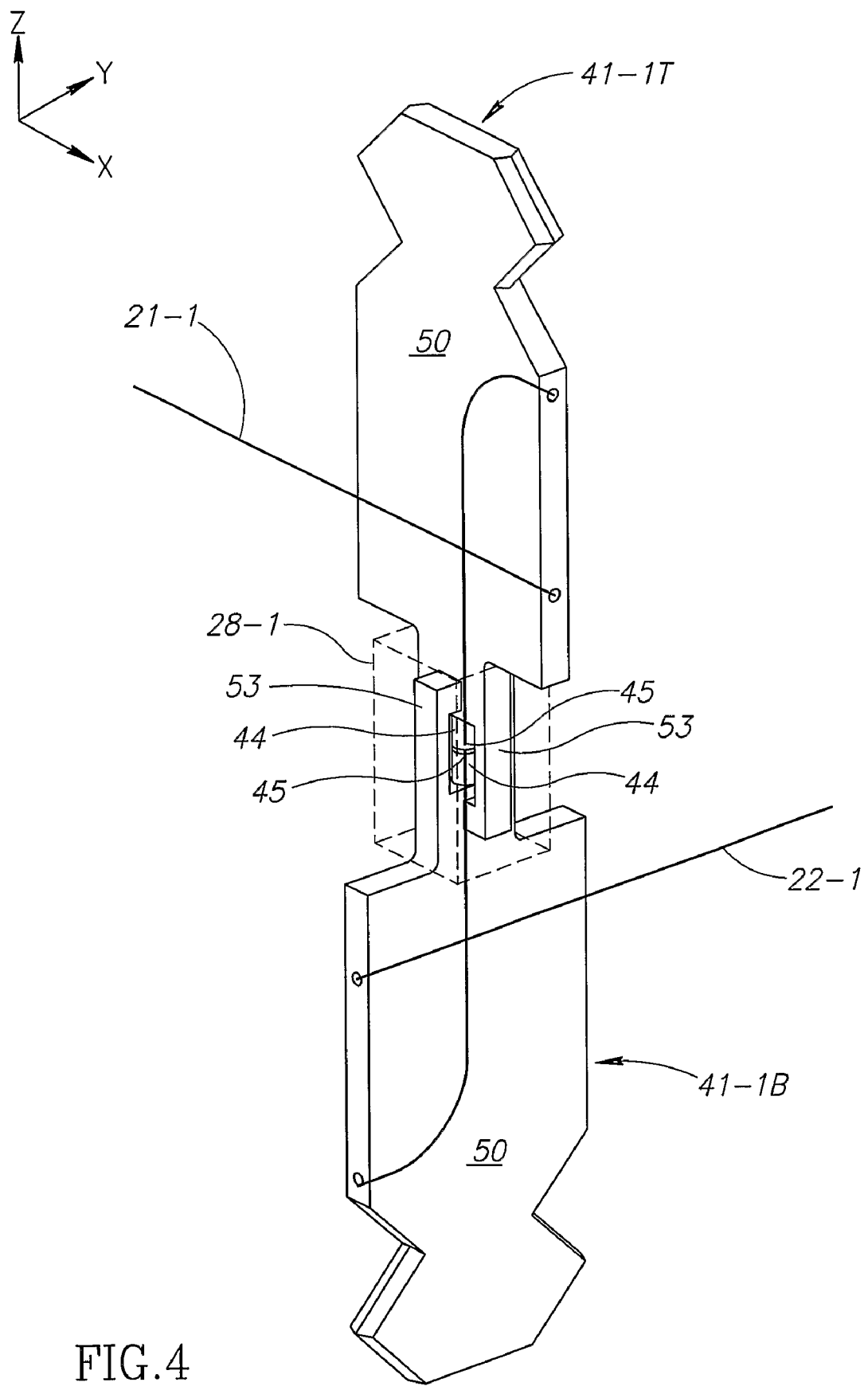
FIG. 4 schematically shows the fiber-end carriages of a top and bottom fiber shown in FIG. 3 inserted into a socket, in accordance with an embodiment of the invention.

FIG. 4 schematically shows a greatly enlarged view of fiber-end carriages 41-1T and 41-1B inserted into socket 28-1, which is shown in dashed lines. Once inserted, spring loaded coupling nubs 44 of the fiber-end carriages resiliently press switch ends 45 of the fibers together to provide optical coupling between the ends and thereby of the fibers. Alignment of switch ends 45 of fibers 21-1 and 22-1 is optionally provided by alignment tines 53 of respective fiber-end carriages 41-1T and 41-1B of top and bottom fibers 21-1 and 22-1. When fiber-end carriages 41-1T and 41-1B of the fibers are inserted into socket 28-1, alignment tines 53 of fiber-end carriage 41-1B of bottom fiber 22-1 grasp fiber-end carriage 41-1T of top fiber 21-1 and align ends 45 of the top and bottom fibers in the y-direction. Alignment tines 53 of fiber-end carriage 41-1T of top fiber 21-1 grasp fiber-end carriage 41-1B of bottom fiber 22-1 and align ends 45 of the fibers in the x-direction.

In some embodiments of the invention, tines 53 of socket prongs 51 of fiber-end carriages 41, in addition to aligning fiber-end carriages 41 and thereby ends 45 of top and bottom fibers 21 and 22 that are optically coupled, function to lock the fiber-end carriages of the fibers together once the carriages are inserted into a socket 28. For example, in some embodiments of the invention tines 53 are elastic. When fiber-end carriages 41 of top and bottom fibers 21 and 22 are inserted into a same socket 28, teeth 54 of the tines of one carriage snap into matching grooves (not shown) in the other carriage to lock the carriages together. When required to decouple the fibers, controller 29 controls top and bottom movers 70 and 80 to pull fiber-end carriages 41 out of the socket into which they are inserted with sufficient force to unsnap the teeth from their grooves. The dimensions and/or internal shape of sockets 28 are adapted to accommodate motion of the elastic tines during insertion into and extraction from the sockets of the fiber-end carriages.

Springs 46, which resiliently press coupling nubs 44 against each other, are configured so that they do not apply sufficient force to unsnap teeth 54 once the carriages are locked together. It is noted that once fiber-end carriages 41 are inserted into a socket 28 to optically couple a top fiber 21 to a bottom fiber 22, the fiber-end carriages maintain in their positions optionally without power consumption until they are decoupled by operation of movers 70 and 80.

In accordance with an embodiment of the invention, when controller 29 (FIGS. 1 and 3) moves a fiber-end carriage 41 of a top or bottom fiber 21 or 22, it controls the fiber's slack-control carriage 42 to move in concert and take up slack in the fiber or reel out fiber length as required by the fiber-end carriage motion. Whichever way along a column of sockets that the controller moves the fiber-end carriage, it simultaneously moves the slack-control carriage in the same direction along the column but at half the velocity at which it moves the fiber-end carriage along the column.

By way of example, FIGS. 5A-5D schematically illustrate motion of fiber-end and slack-control carriages 41 and 42 of a top fiber 21 along a column 25 of sockets 28 as controller 29 (FIGS. 1 and 3) controls mover 70 to align the fiber-end carriage with a particular socket 28-1 and insert the fiber-end carriage into the socket.

In FIG. 5A controller 29 has controlled mover 70 and grabbers 73 and 74 to grasp fiber-end and slack-control carriages 41 and 42 by their respective carrier handles 52 and 62 and lift them out of their parking positions. In parking positions, the carriages are optionally inserted into and supported by parking sockets 90, which are shown for convenience of presentation half as deep as sockets 28. It is noted that since a parking socket 90 receives only a single carriage, while a socket 28 is required to receive two carriages (fiber-end carriages 41 of a top and a bottom fiber 21 and 22 when it is used to couple fibers) a parking socket 90 may in general be shallower than a socket 28.

In FIG. 5B, mover 70 has moved fiber-end carriage 41 from its parking position to align the carriage with a particular socket labeled 28-1. In order to provide sufficient length of fiber 21 so that fiber-end carriage 41 is free to move to socket 28-1 without generating slack in the fiber, controller 29 controls grabber 74 holding slack-control carriage 42 to translate the slack-control carriage along socket column 25 a distance equal to half that by which grabber 73 translates fiber-end carriage 41.

Distances between the parking positions of fiber-end and slack-control carriages 41 and 42 and sockets 28 are such that when fiber-end carriage 41 is aligned with a socket 28, translation of slack-control carriage 41 aligns the slack-control carriage with a socket 28, a parking socket 90 or with a wall 91 that separates adjacent sockets or parking sockets.

In FIG. 5B, slack-control carriage 42 is aligned with a socket 28 labeled 28-2. In FIG. 5C controller 29 has controlled grabbers 73 and 74 to insert socket prong 51 of fiber-end carriage 41 into socket 28-1 and bifurcated socket prong 61 of slack-control carriage 42 into socket 28-2. Controller 29 is now free to control mover 70 to release carriages 41 and 42 and proceed to move a different set of fiber-end and slack-control carriages.

FIG. 5D schematically shows a case in which slack-control carriage 42 is aligned with a wall 91 that separates two sockets 28. Fiber-end carriage 41 is translated along column 25 to align the carriage with a socket 28-3 adjacent to socket 28-1. In FIG. 5D, fiber-end carriage 41 has been moved by a distance greater than that shown in FIG. 5C equal to a distance between adjacent sockets 28. In order to provide a length of top fiber 21 sufficient to provide free motion of the fiber-end carriage without generating slack in the fiber, slack-control carriage 42 is translated along column 25 by a distance (additional to that shown in FIG. 5C) equal to half a distance between adjacent sockets 28. As a result, slack-control carriage 42 is aligned with wall 91 between socket 28-2 and a socket 284. When fiber-end carriage 41 is inserted into socket 28-3, slack-control carriage 42 is inserted into sockets 28-2 and 28-4 and its bifurcated socket prong 61 straddles wall 91 between the sockets.

When moving fiber-end carriage 41 back to its parking position, controller 29 reverses the motions of fiber end and slack-control carriages 41 and 42 schematically shown in FIGS. 5A-5D. The controller controls grabber 73 to translate fiber-end carriage 41 back to its parking position along column 25 at a speed that is twice the speed that it controls grabber 74 to translate slack-control carriage 42 back to its parking position.

In some embodiments of the invention, each fiber 21 is formed with a discontinuity such as a slight bend, a break or thinning in the fiber cladding, or an optical shunt that causes a relatively small fraction of light transmitted along the fiber to exit the fiber. The light that exits a fiber 21 in the vicinity of the discontinuity is sensed and used to detect and monitor light transmission through the fiber.

Figure 6:
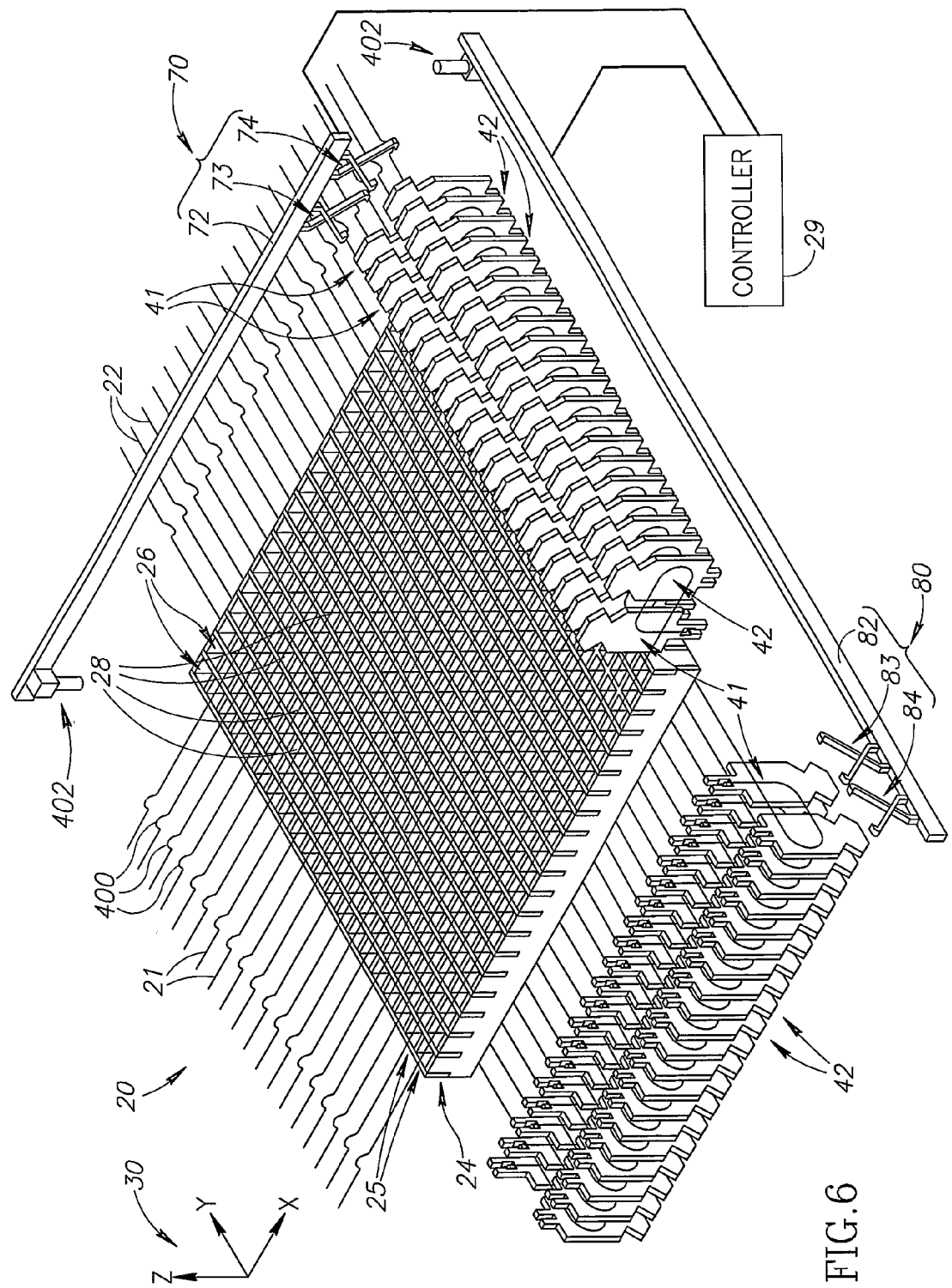
FIG. 6 schematically shows an optical crossbar switch similar to the optical crossbar switch shown in FIGS. 1 and 3 comprising apparatus for monitoring optical transmissions along optical fibers in the crossbar switch, in accordance with an embodiment of the invention.

FIG. 6 schematically shows each fiber 21 formed with a discontinuity in the shape of a small bend 400 that causes a relatively small portion of the light transmitted in the fiber to exit the fiber. A bend 400 having a radius between about 1 mm and about 5 mm will generally cause between about 1% to about 5% of light transmitted along the fiber to exit the fiber in the vicinity of the bend. Optionally, bends 400 are formed at positions along the lengths of fibers 21 that lie outside of array 24 and lie substantially along a same straight line perpendicular to the fibers. Optionally, carrier beam 72 has at least one optical detector 402 mounted to the beam for detecting light that exits fibers 21 in the neighborhoods of their respective bends 400.

To detect and monitor light transmission through a particular fiber 21, controller 29 translates carrier beam 72 along the y-direction until optical detector 402 is aligned above bend 400 in the fiber and positioned to detect light that exits the fiber in the vicinity of the bend. Optionally, detector 402 is controllable by controller 29, using any of various motors or actuators and techniques known in the art, to be moved in the z direction so that it can be placed substantially contiguous with the bend. Signals generated by detector 400 responsive to light that it detects exiting a fiber 21 from its bend 400 are optionally transmitted to controller 29 which processes the signals to monitor characteristics, such as quality and data rate, of transmissions in the fiber Discontinuities or shunts are similarly formed in optic fibers 22 to "siphon off" relatively small portions of the light transmitted along the fibers 22 in order to monitor optical transmission in the fibers. Optionally, carrier beam 82 is equipped similarly to carrier beam 72 with at least one optical detector 402 for sensing the siphoned off light.

The inventors have found that a crossbar switch in accordance with an embodiment of the invention, similar to crossbar switch 20 can be configured to accommodate and switch a relatively large number of optic fibers in a relatively small spatial volume. By way of a numerical example, in accordance with an embodiment of the invention, plates 50 and 60 of carriages 41 and 42 are optionally between about 0.5 mm to about 2.5 mm thick and have a width and height of about 20 mm and 50 mm respectively. (Thickness is a dimension along the y-axis in FIG. 2A, width a dimension along the x-axis and height a dimension along the z-axis). Optionally, socket prong 51 comprised in fiber-end carriage 41 and bifurcated socket prong 61 comprised in slack-control carriage 42 have widths (along the x-axis in FIG. 2A) between 0.5 mm and 2.5 mm. Optionally, socket prong 51 has a length (along the z-axis) between about 1 mm to 10 mm and bifurcated socket prong 61 a length between about 1 mm to 5 mm.

Plates 50 and 60 may be fabricated using any of many different methods known in the art. For example, the plates may be fabricated from a sandwich comprising an inner layer of a suitable light material such as a plastic foam bonded between two external skins, optionally formed from a metal or plastic. Alternatively, for example, the plates may be formed by welding together optionally mirror-image planar plastic pieces, each having an external profile similar to that of carriage plates 50 and 60. When welded together, structures on sides of the pieces that face each other form channels through which an optical fiber is threaded, e.g. channels 58 and 59 in fiber-end carriage 41 and channel 66 in slack-control carriage 42.

Sockets 28 in honeycomb array 24 optionally have dimensions that match dimensions of socket prong 51 and bifurcated prong 61. For example, in some embodiments of the invention, sockets 28 have dimensions along the x and y-axes equal to about the width of the prongs 51 and 61, i.e. for prongs having a width of 1.5 mm for example, each socket has internal dimensions along the x and y-axes equal to about 1.5 mm. Optionally, sockets 28 have a depth along the z-axis between 2 mm to 10 mm. In some embodiments of the invention, walls separating adjacent sockets 28 in honeycomb array 24 have a thickness equal to about 0.2 mm.

Assume that the crossbar switch is intended to accommodate 1000 top fibers 21 and 1000 bottom fibers 22 and in conformity with the dimensions noted above that each socket 28 in the crossbar switch has a cross section parallel to the plane of the array that is about 1.5 mm. Assume further that each row 26 and column 25 of sockets 28 comprises about 6 cm of parking sockets 90 and that movers 70 and 80 require operating and clearance distance above honeycomb array 24 equal to about a height of a carriage plus about 20 cm. Then the crossbar switch requires a volume of about $1.56^2$ m×0.5 m equal to about 1.2 m$^3$ to manage the coupling and uncoupling of the fibers.

Figure 7:
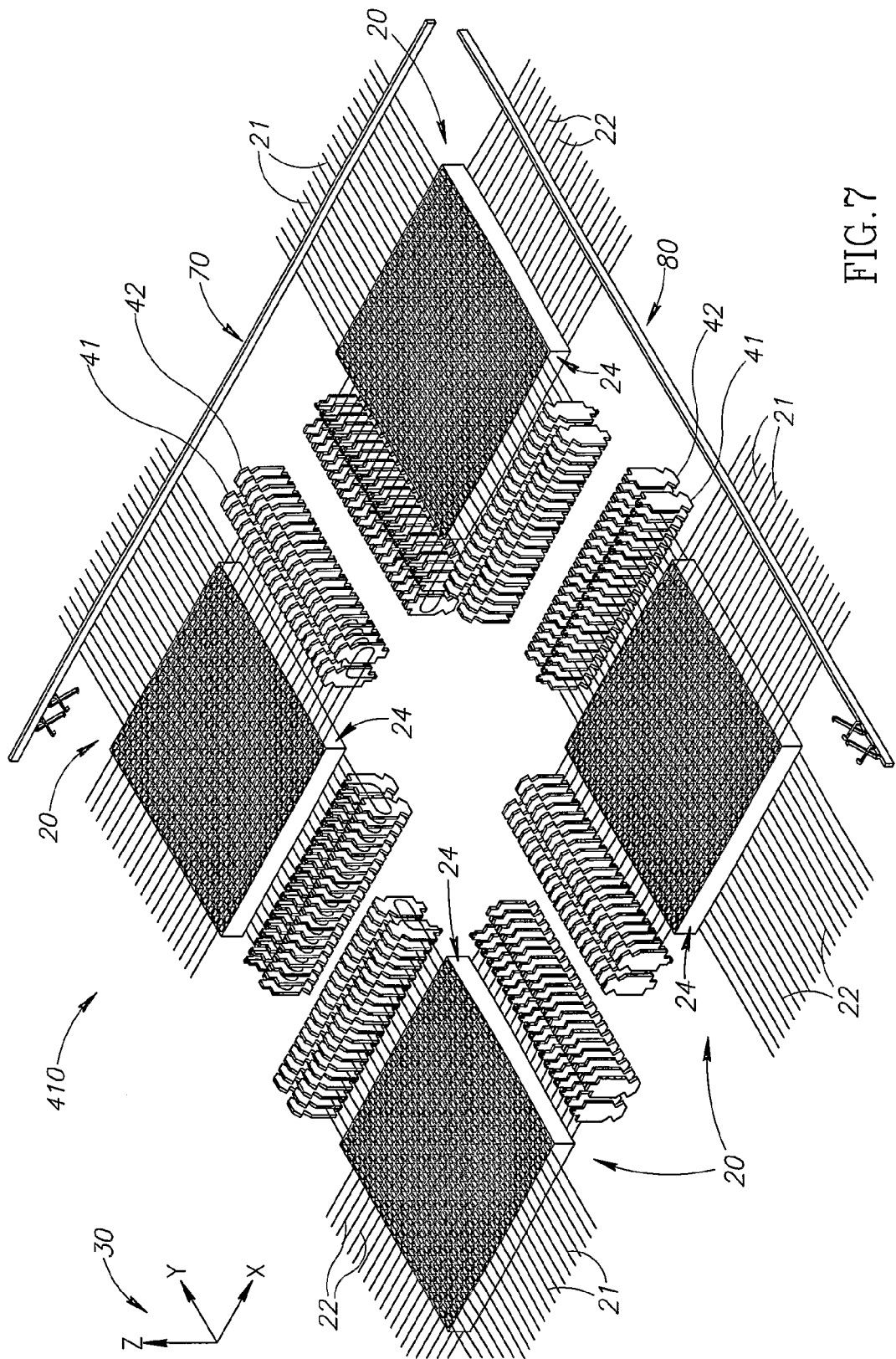
FIG. 7 schematically shows a configuration of a plurality of crossbar switches, in accordance with an embodiment of the invention.

A plurality of crossbar switches in accordance with an embodiment of the invention, such as a crossbar switch similar to crossbar switch 20 (FIG. 1), may also be packed in a relatively small volume. For example, FIG. 7 schematically shows a plurality of four crossbar switches 20 compactly configured in a checkerboard array 410. Assuming that each crossbar switch 20 comprises 1000 top fibers 21 and 1000 bottom fibers 22, array 410 provides a total of 4×10$^6$ different fiber connections. Honeycomb socket arrays 24 of crossbar switches 20 are optionally coplanar and each honeycomb array is positioned so that the rows of sockets 28 (FIG. 1) of the honeycomb array are accurately aligned either parallel or perpendicular to the x-axis. As a result, a single top carrier 70 and a single bottom carrier 80 are sufficient to control placement of all fiber-end carriages and slack-control carriages in checkerboard array 410. If each crossbar switch 20 has the dimensions noted in the preceding paragraph, checkerboard array occupies about 4.8 m$^2$.

Honeycomb socket array 24 may be formed using any of many different methods known in the art. Optionally, honeycomb array 24 is formed using techniques, methods and materials used to provide radiation collimators, for example, for CT scanners. Such methods are described, for example, in U.S. Pat. Nos. 6,363,136, 4,054,800, 4,450,706 and 3,943,366, the disclosures of which are incorporated herein by reference. In FIGS. 1 and 3, the array is shown, by way of example, constructed from thin, identical, strips of a suitable material that are slotted with uniformly spaced slots. A first set of the strips are oriented parallel to each other and inserted one into the slots of the other of a second set of the strips that are parallel to each other and orientated perpendicular to the first set of strips. The strip spacing and thickness of the strips determine the size of the honeycomb sockets.

The inventors have found that a relatively large and mechanically stable and robust honeycomb array may be formed using slotted strips that are inserted one into the slots of the other in which rather than having a same spacing between all slots in all the strips, some of the strips have non-uniform spacing. When assembled, the non-uniform spacing distorts the strips sufficiently to generate stress in the strips that provide the assembled array with mechanical stability. The inventors have determined that a robust, mechanically stable "stress reinforced" honeycomb structure in which dimensions of the sockets in the honeycomb are substantially uniform may be produced with a relatively moderate, non-uniformity in slot spacing of some of the strips.

In an embodiment of the invention a "stress reinforced" honeycomb comprises a first set of parallel strips comprising a plurality of groups of identical strips formed with uniformly spaced slots. The groups of uniformly slotted strips are interleaved with pairs of strips formed with slots that are non-uniformly spaced. The strips of the first set are inserted one into the slots of strips of a second, optionally identical, set of strips that are oriented in a direction perpendicular to the first set of strips.

Figure 8:
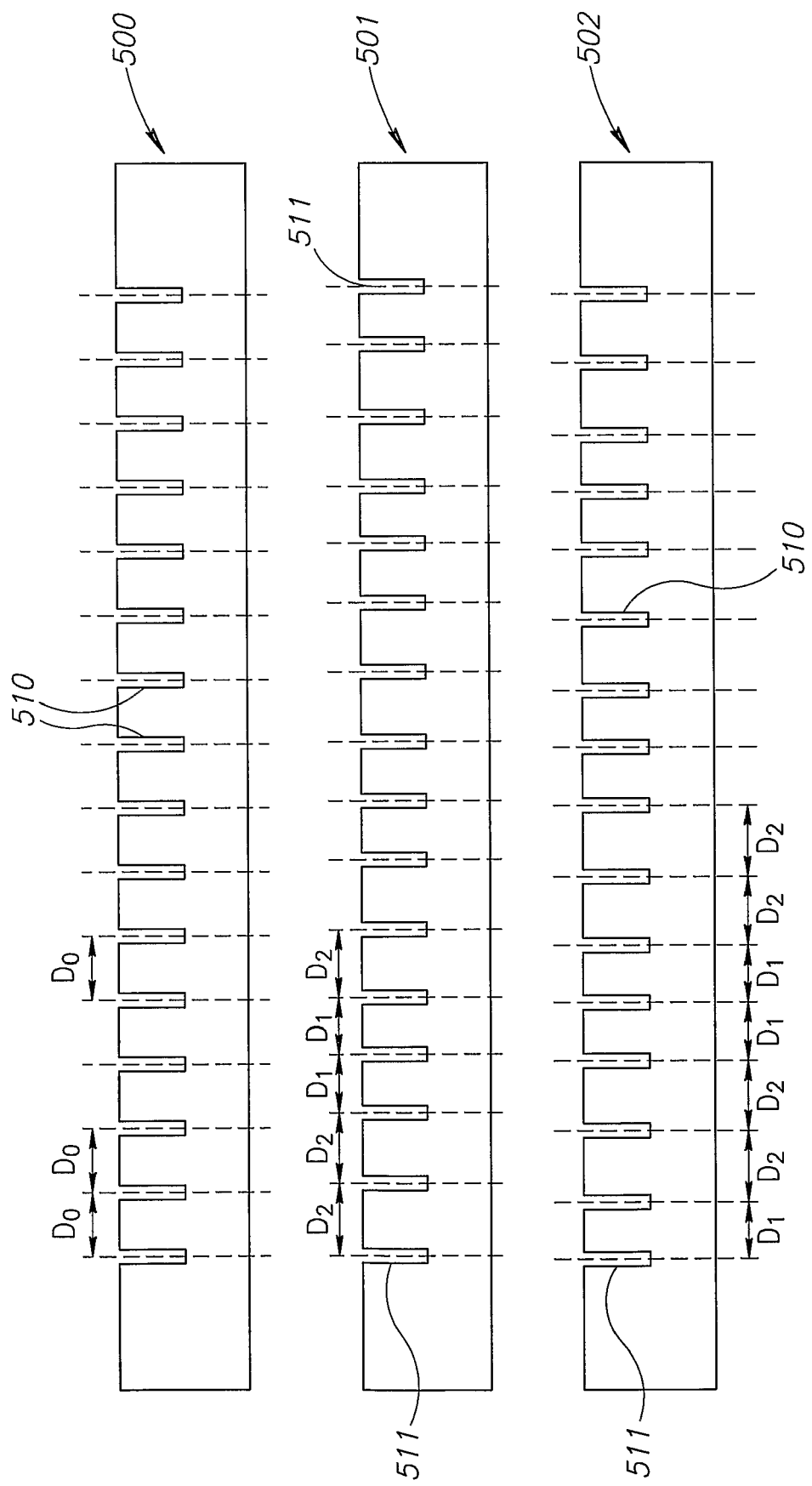
FIG. 8 schematically shows slotted strips used in producing a honeycomb array of sockets comprised in a crossbar switch similar to that shown in FIG. 1, in accordance with an embodiment of the invention.

FIG. 8 schematically shows slotted strips 500, 501 and 502 that are optionally used to form such a stress reinforced honeycomb socket array, and relationships between the locations of their slots. Strip 500 has slots 510 that are uniformly spaced apart by a distance $D_O$ and is representative of the plurality of strips that are used to provide the groups of uniformly slotted strips. Strips 501 and 502 are formed with non-uniformly spaced slots 511 and are representative of strips in the pairs of strips that interleave the groups of uniformly slotted strips 500. Optionally, any two adjacent slots 511 are separated by one of two distances $D_1$ and $D_2$. Optionally, a first and fifth slot 510 of any five consecutive slots 511 are separated by a distance equal to $4D_O=(2D_1+2D_2)$. Optionally, strip 501 is identical to strip 502, reversed from right to left.

By way of a numerical example, optionally, strips 500, 501 and 502 are formed from sheet metal, optionally stainless steel, about 0.2 mm thick, slots 510 and 511 are 0.3 mm wide, $D_O=2.2$ mm, $D_1=2.12$ mm and $D_2=2.28$ mm. Strips having these dimensions are used to form a honeycomb socket array in accordance with an embodiment of the invention, in which the sockets have 2 mm×2 mm square "apertures". Dimensions and shape of the stress reinforced honeycomb socket array may be varied by varying the length and the number of strips used. For example, the array may be rectangular or square and have a side dimension as large as or greater than a meter. The reinforcing stress generated in the assembled array by the non-uniformly slotted strips may be varied by varying the degree of non-uniformity in the spacing of the slots and/or the number of uniformly slotted strips sandwiched between non-uniformly slotted strips. For a given degree of non-uniformity in the slotting, stress decreases with increasing number of the uniformly slotted strips between non-uniformly slotted strips. By way of example, the inventors have found that for a square honeycomb array about a half meter on a side formed from strips having dimensions similar to those noted above, advantageously about eight uniformly slotted strips are sandwiched between non-uniformly slotted strips.

Features of a crossbar switch similar to crossbar switch 20, in accordance with an embodiment of the invention, may vary from those described above. For example, in some embodiments of the invention, fiber-end carriages of top and bottom fibers 21 and 22 inserted into a socket 28 and switch ends 45 of their fibers may be held together by devices similar to tines 53 that are parts of coupling nubs 44 (FIG. 2A). Many and varied methods and devices for holding ends of optic fibers together to provide optical contact of the fibers are known in the art and any of these may be adapted for use with fiber-end carriages in accordance with an embodiment of the invention. In some embodiments of the invention, apparatus for holding fiber-end carriages 41 and switch ends 45 of their respective optic fibers 21 and 22 together comprise magnetized regions that attract and hold each other together when the carriages are inserted into a same socket 28. Such "magnetized" apparatus optionally comprises components that are parts of socket 28.

In some embodiments of the invention, honeycomb array 24 has a configuration that resembles more closely in its structure a natural honeycomb and comprises rows and columns of interlaced hexagonal sockets rather than square sockets. In some embodiment of the invention, an array similar to array 24 comprises "guide runners" that aid in maintaining carriages aligned with their respective columns or rows of sockets.

Figure 9:
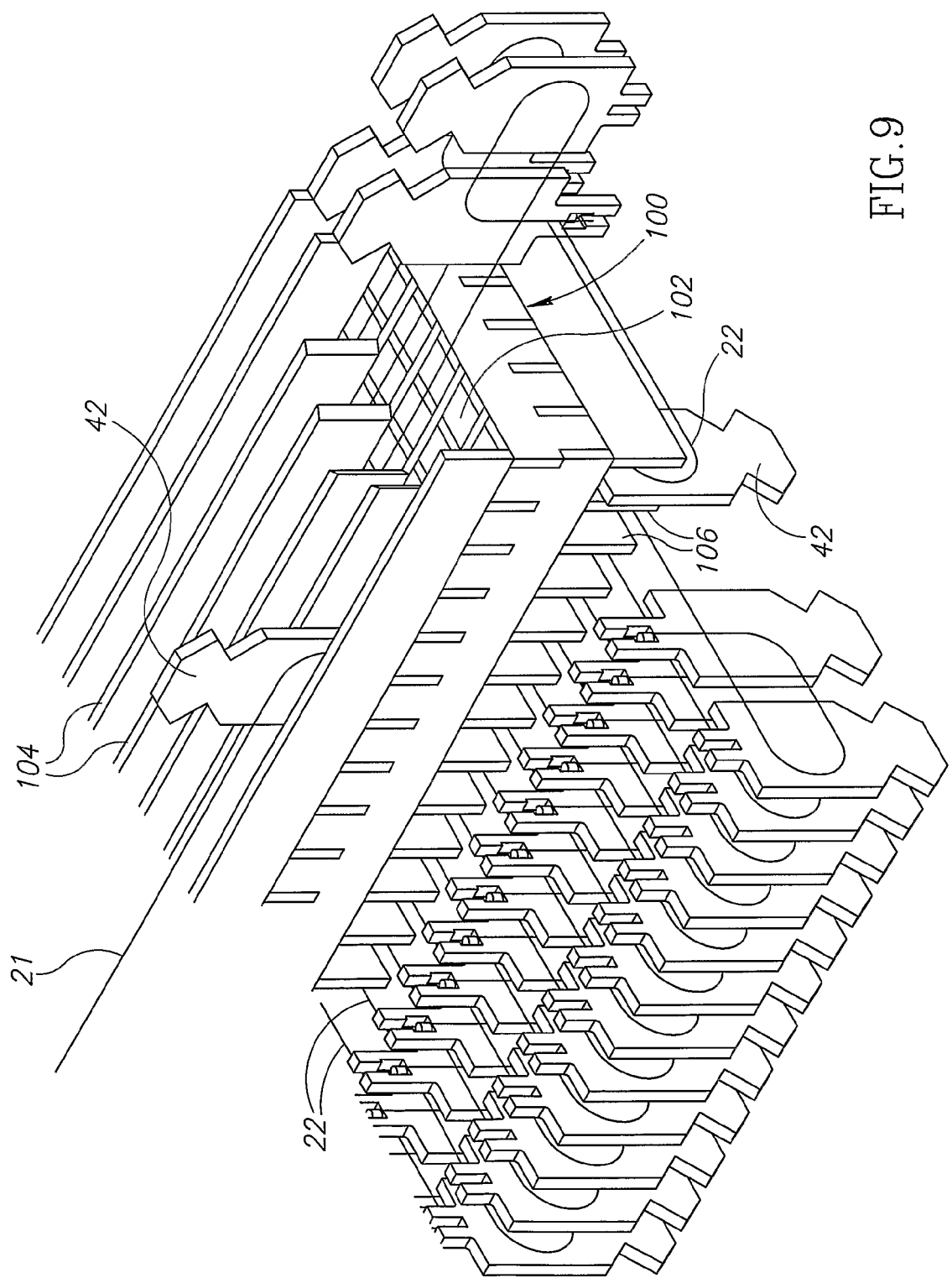
FIG. 9 schematically shows a portion of an optical crossbar switch comprising guide rails for aligning fiber-end and slack-control carriages with sockets, in accordance with an embodiment of the invention.

FIG. 9 schematically shows a portion, partially cutaway, of a honeycomb array 100 of optionally square sockets 102 comprising top and bottom runners 104 and 106 that maintain alignment of carriages of top and bottom fibers with their respective columns and rows of sockets. The figure schematically shows a slack-control carriage 42 of a top fiber 21 and a slack-control carriage 42 of a bottom fiber 22 between their associated guide runners 104 and 106 respectively after the carriages have been moved to accommodate coupling of fibers in the crossbar switch.

Figure 10:
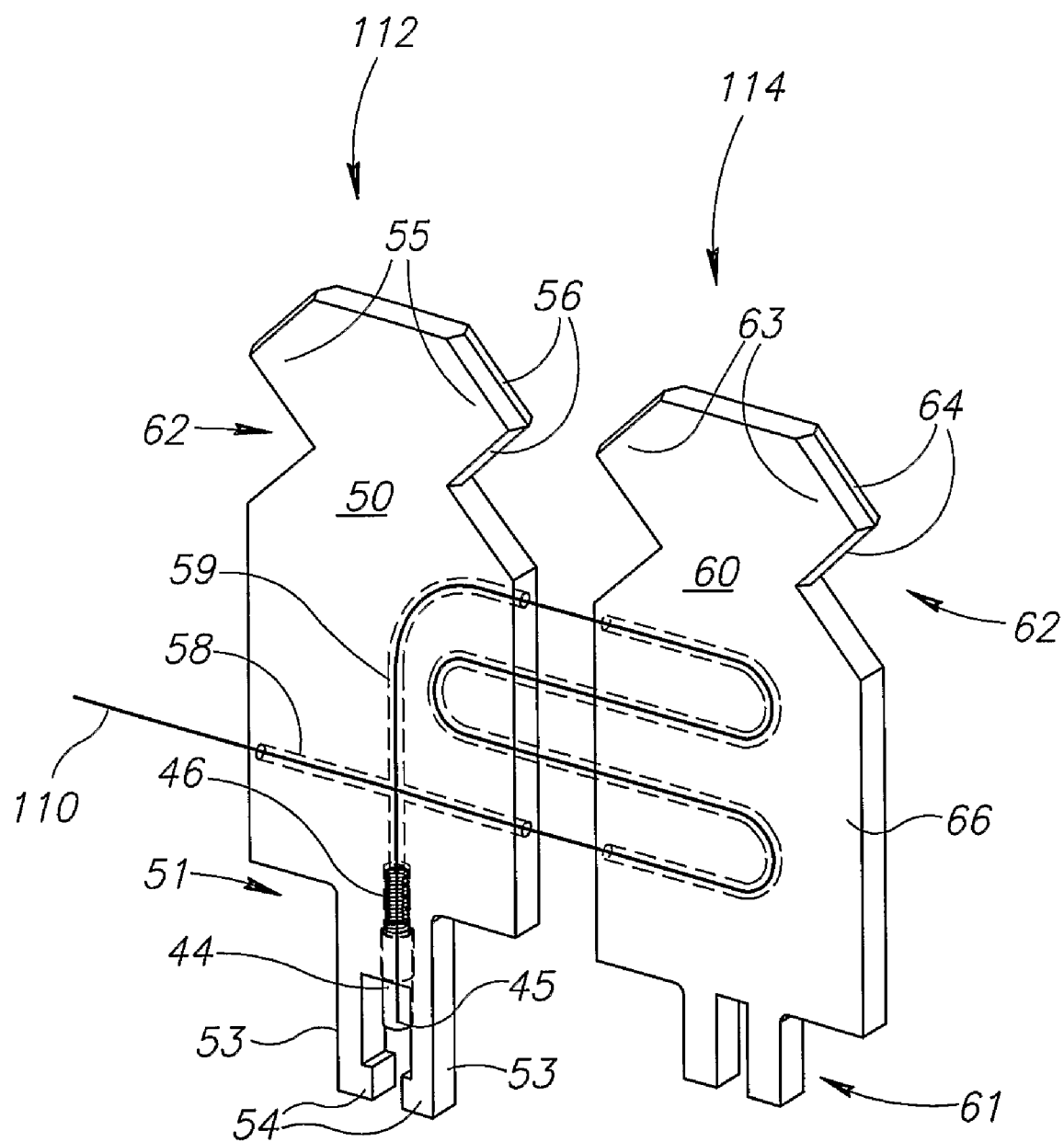
FIG. 10 schematically shows a side view of a configuration of a switch-end and a slack-control carriage, in which four lengths of a fiber extend between the carriages, in accordance with an embodiment of the invention.

In some embodiments of the invention, more than two lengths of an optic fiber are extended between a fiber-end carriage and its associated slack-control carriage in a crossbar switch. FIG. 10 schematically shows a side view of a configuration, in accordance with an embodiment of the invention, in which four lengths of a fiber 110 extend between a fiber-end carriage 112 and its associated slack-control carriage 114. To maintain the lengths of fiber 110 between the carriages substantially without slack, slack-control carriage 114 moves in a same direction along which fiber-end carriage 112 moves but at a quarter of the speed.

In some embodiments of the invention, a crossbar switch similar to crossbar switch 20 comprises a plurality of top and bottom movers 70 and 80 to administer coupling and uncoupling of optic fibers 21 and 22. In some embodiments of the invention, each pair of fiber-end and slack-control carriages comprises its own mover. Optionally, the mover comprises a different motor coupled to each carriage for moving the carriage.

In many applications a pair of optical fibers is used to provide a communication link between first and second signal ports. Each of the fibers in the pair functions as a simplex link between the ports that transmits optical signals in a direction opposite to that of the other fiber. A first one of the fibers carries transmissions from the first port to the second port and the second of the fibers carries transmissions from the second port to the first port.

In some embodiments of the invention, a crossbar switch is configured to support such applications and a pair of optical fibers is mounted to and threaded through the channels of top and bottom fiber-end and slack-control carriages in the crossbar switch. Fiber-end and slack-control carriages in the crossbar switch are moved and positioned to couple any top pair of optical fibers to any bottom pair of optical fibers and control slack in the fibers similarly to the manner in which crossbar switch 20 operates to couple top and bottom fibers 21 and 22 and control their slack.

Figure 11A:
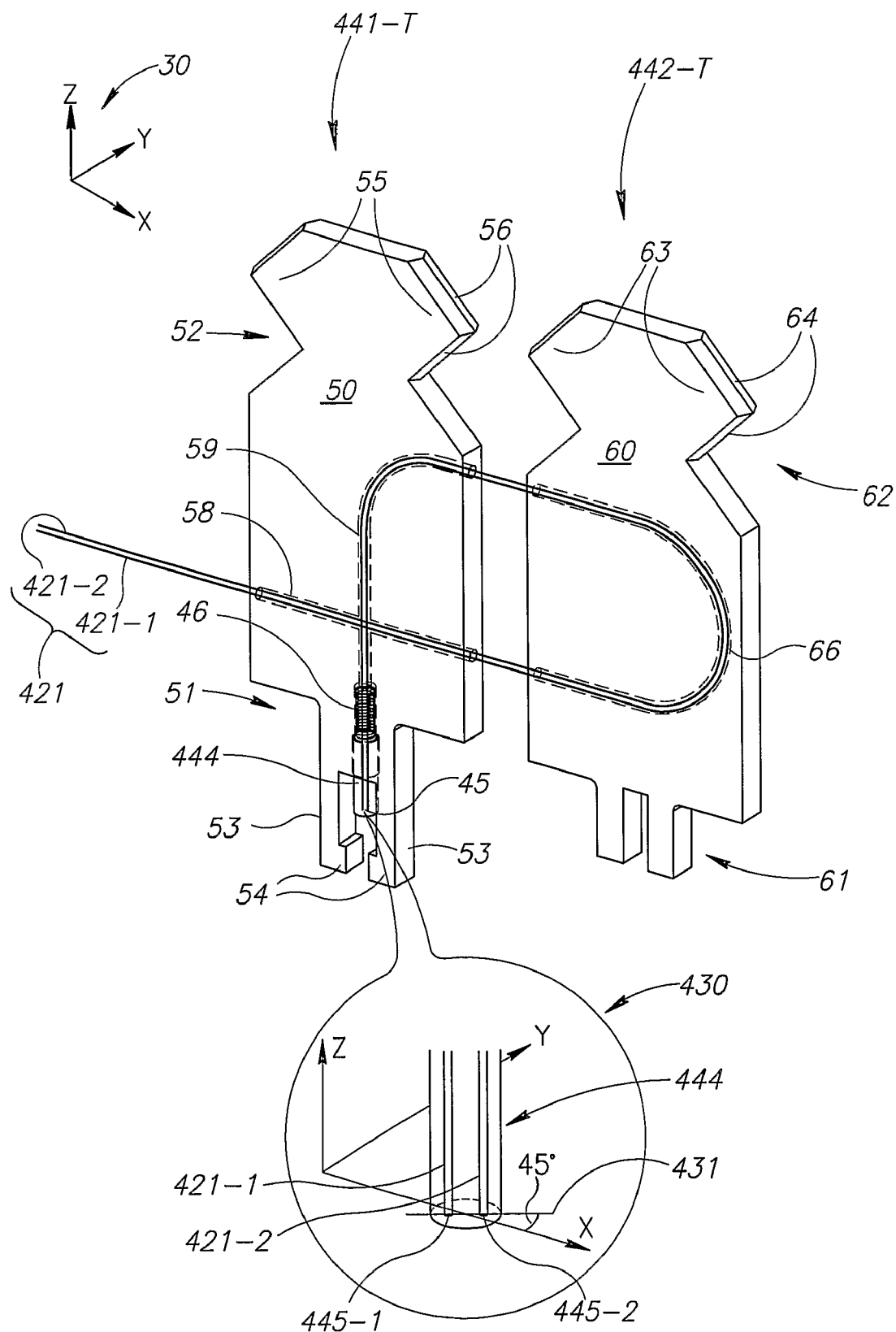
FIG. 11A schematically shows a fiber-end carriage and a slack-control carriage mounted with two optical fibers, in accordance with an embodiment of the present invention.

FIG. 11A schematically shows a top fiber-end carriage 441-T and its associated top slack-control carriage 442-T threaded with a pair 421 of top fibers 421-1 and 421-2 comprised in a crossbar switch (not shown) similar to crossbar switch 20 shown in FIG. 1. Fibers 421-1 and 421-2 are mounted to and threaded through fiber-end and slack control carriages 441-T and 442-T similarly to the manner in which top fiber 21 is mounted to and threaded through fiber-end and slack control carriages 41 and 42 shown in FIG. 2A. As for carriages 41 and 42 in FIG. 2A, carriages 441-T and 442-T are assumed to be moved along a direction indicated by the x-axis of a coordinate system 30 and the planes of carriages 441-T and 442-T are assumed to be parallel to the x-axis Ends 445-1 and 445-2 of fibers 421-1 and 421-2 respectively are mounted to a dual fiber coupling nub 444 (the ends and the fibers and the coupling nub are most clearly shown in an inset 430) using any of various methods and devices known in the art so that the x and y coordinates of the fiber ends relative to fiber-end carriage 441-T are accurately maintained and a line 431 through the fiber ends is oriented and accurately maintained at a predetermined angle with respect to the x-axis. Optionally, the predetermined angle is about 45°.

Fibers 421-1 and 421-2 are optionally spring loaded in dual fiber coupling nub 444 using any of various devices and methods known in the art so that they are resiliently urged in the negative z-direction. Whereas by way of example, in FIGS. 11A and 11B a resilient element 46 is shown spring loading dual fiber coupling nub 444, in some embodiments of the invention each fiber 421-1 and 421-2 is independently spring loaded. The spring loading facilitates optical coupling of fibers 421-1 and 421-2 with fibers in bottom fiber pairs.

Figure 11B:
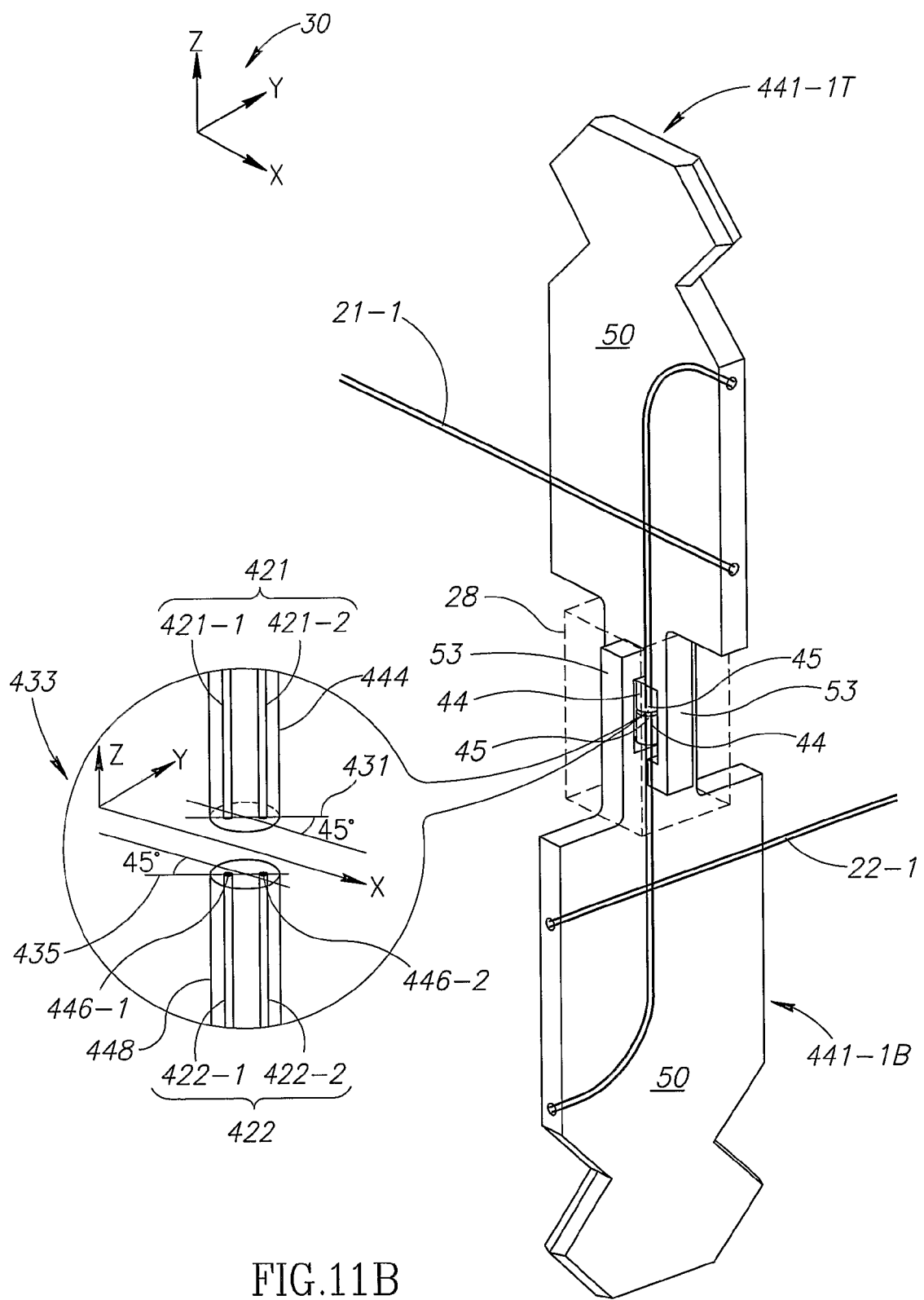
FIG. 11B schematically shows top and bottom fiber-end carriages each mounted with a pair of optical fibers and positioned to optically couple the pairs of fibers.
Figure 12:
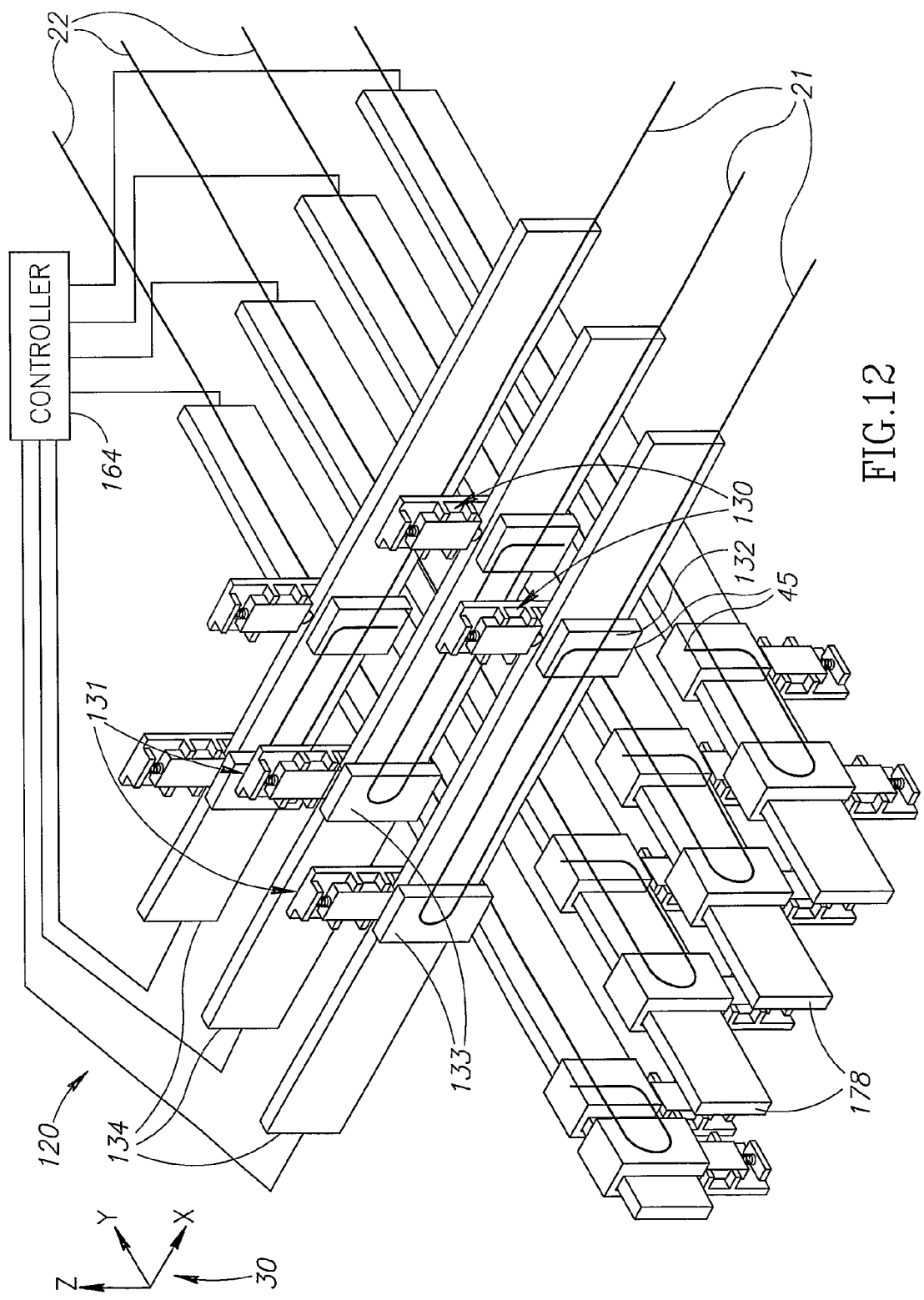
FIG. 12 schematically shows an optical crossbar switch in which each carriage is moved by its own motor, in accordance with an embodiment of the invention.

FIG. 11B schematically illustrates fiber-end carriage 441-T positioned in a socket 28, shown in dashed lines, of a honeycomb socket array of the crossbar switch in which they are comprised to optically couple fiber pair 421 with a bottom pair 422 of fibers 442-1 and 442-2. A region in which top and bottom fiber pairs 421 and 422 are coupled is shown in an enlarged view in an inset 433. Bottom fiber pair 422 is mounted to a bottom fiber-end carriage 441 and ends 446-1 and 446-2 of fibers 442-1 and 442-2 respectively are mounted to a dual fiber coupling nub 448 similarly to the way in which fiber pair 221 is mounted to dual coupling nub 444. Dual coupling nub 448 maintains the positions of fiber ends 446-1 and 446-2 so that a line 435 through the ends is accurately oriented at a same angle with respect to the x-axis as is line 431. In some embodiments of the invention, a crossbar switch does not comprise a honeycomb array of sockets in which carriages are mounted. FIG. 12 schematically shows a crossbar switch 120, in accordance with an embodiment of the invention, that does not comprise an array of sockets into which fiber-end carriages are inserted to optically couple top and bottom fibers. Crossbar switch 120 comprises features similar to those of a crossbar switch described in PCT publication WO 02/43432, the disclosure of which is incorporated herein by reference.

By way of example, crossbar switch 120 comprises a first plurality of three top optic fibers 21 and a second plurality of four bottom optic fibers 22. Crossbar switch 120 is therefore a "3×4" crossbar switch configured to optically couple any one of the three top optic fibers 21 to any one of the four bottom optic fibers 22. To prevent clutter, only some of identical features of crossbar switch 20 are labeled with reference numerals.

Each top optic fiber 21 is optionally mounted to a front panel 132 of a top fiber-end carriage 130, which is mounted to a top guide rail 134. The optic fiber is also mounted to a front panel 133 of a slack-control carriage 131. Fiber 21 is mounted to front panels 132 and 133 optionally via a system of channels not shown similar to channels 58, 59 and 66 shown in FIG. 2A. Top guide rails 134 are optionally parallel to the x-axis of coordinate system 30 and, by way of example, are coplanar and have a rectangular cross-section. The plane of top guide rails 134 is parallel to the xy-plane.

Figure 13:
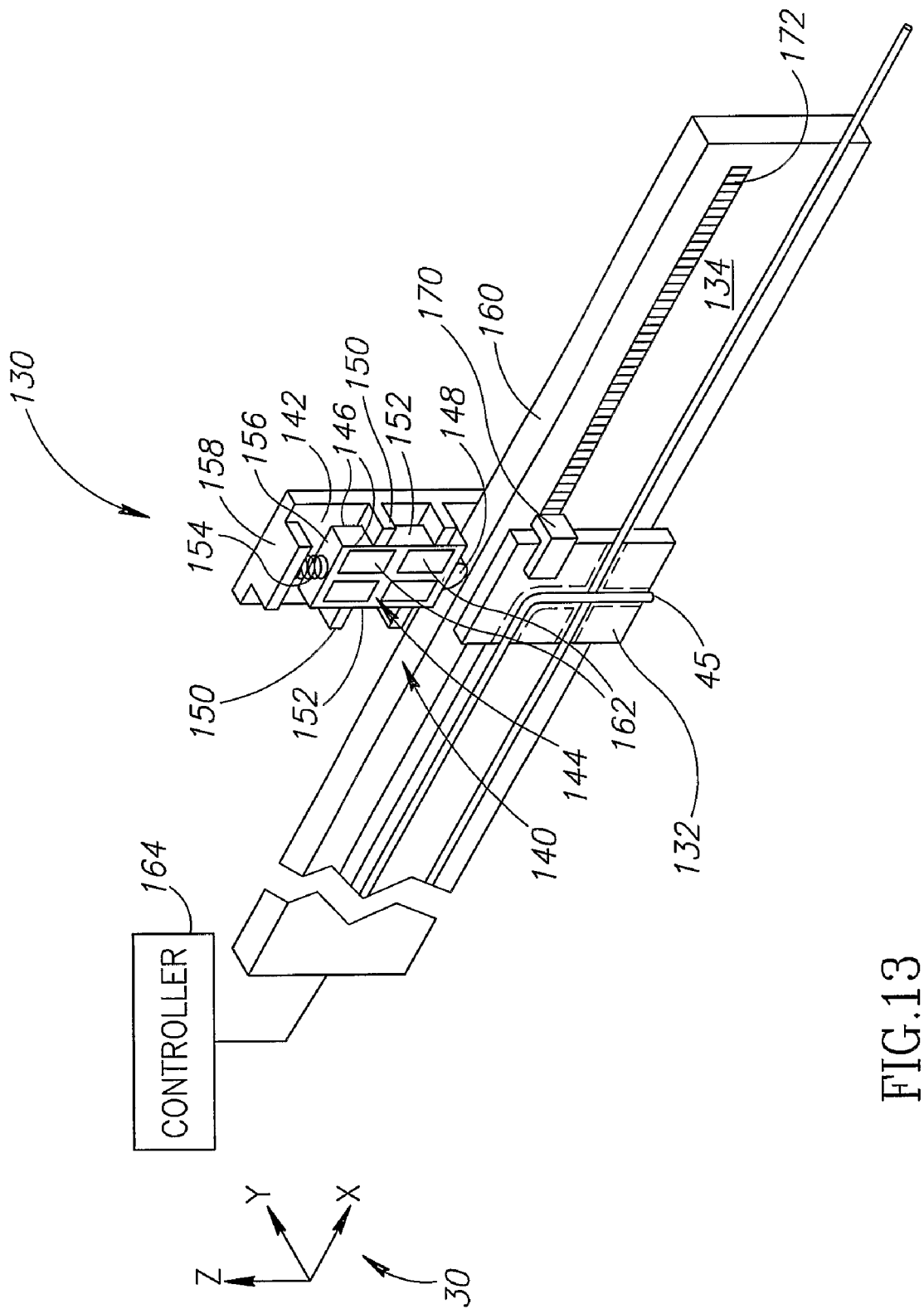
FIG. 13 schematically shows an enlarged view of a fiber-end carriage comprised in the optical crossbar switch shown in FIG. 8.

Details and features of fiber-end carriage 130 and other elements of crossbar switch 120 are more easily seen in a magnified view of a region of the crossbar switch shown in FIG. 13. A piezoelectric motor 140 is optionally mounted to a back panel 142 of each fiber-end carriage 130. In some embodiments of the invention, piezoelectric motor 140 is of a type described in U.S. Pat. No. 5,616,980 to Zumeris et al, or in PCT Applications PCT/IL99/00288 and PCT/IL99/00576 entitled "Multilayer Piezoelectric Motor", the disclosures of which are incorporated herein by reference.

Piezoelectric motor 140 comprises a thin rectangular piezoelectric vibrator 144 having two face surfaces 146 and, optionally, a friction nub 148. Piezoelectric motor 140 is mounted to back panel 142 using techniques known in the art and is shown, by way of example, being held in place by four tangs 150 (only two of which are numbered). Tangs 150 press on long edge surfaces 152 of piezoelectric motor 140, preferably, at nodal regions along the edge surfaces of the motor. A suitable spring 154 or other source of resilient force is coupled between a short edge surface 156 of piezoelectric motor 140 and a lip 158 that extends from back panel 142. Spring 154 operates to resiliently urge piezoelectric motor 140 towards guide rail 134 so that friction nub 148 presses on an edge surface 160 of guide rail 134.

Vibrator 144 optionally has four quadrant electrodes 162 on one face surface 146 and a single large electrode (not shown) on the other face surface 146 of the vibrator. A controller 164 electrifies quadrant electrodes 162 to generate appropriate vibrations in friction nub 148 that move fiber-end carriage 130 along its guide rail 134 selectively in either the positive or the negative x-direction. Methods and electrification configurations for electrifying quadrant electrodes 162 to provide desired vibrations in friction nub 148 are described in U.S. Pat. No. 5,616,980 and in PCT applications PCT/IL99/00288 and PCT/IL99/00576, referenced above.

A position-sensing device 170, such as an optical, magnetic or capacitive position sensor, is optionally mounted to each top fiber-end carriage 130 and transmits signals responsive to coordinates of positions of the fiber-end carriage along its guide rail 134 to controller 164. In FIGS. 12 and 13, position-sensing device 170 is schematically shown as an optical position sensing device that generates coordinate position signals responsive to fiducial markings 172 on guide rail 134. Controller 164 uses the coordinate signals to control motion and position of top fiber-end carriage 30.

Slack-control carriage 131 (FIG. 12) is constructed similarly to fiber-end carriage 130 but comprises a front panel 133 instead of front panel 132.

Referring again to FIG. 12, bottom optic fibers 22 are, optionally, similarly mounted to fiber-end and slack-control carriages 130 and 131 that are moved back and forth by piezoelectric motors 140 along, optionally, coplanar bottom guide rails 178 that are parallel to the y-axis. Switch end 45 of a bottom fiber 22 mounted to a fiber-end carriage 130 points in the positive z-direction. To optically couple a top fiber 21 to a bottom fiber 22 controller 164 controls fiber-end carriages 130 of the fibers to move their switch ends 45 along their respective guide rails 134 and 178 so that the switch ends face each other. The controller controls slack-control carriage 131 of each fiber to move along the guide rail in concert with movement of the fiber's fiber-end carriage 130 to adjust fiber length between the carriages and enable free motion of the fiber-end carriage without generating slack in the fiber.

Optionally, controller 164 comprises a memory in which alignment coordinates are stored for each pair of top and bottom optic fibers 21 and 22. The alignment coordinates define positions of the fiber-end carriages along their respective guide rails 134 and 178 for which switch ends 45 of the pair of fibers are aligned facing each other. To align a particular top fiber 21 with a particular bottom fiber 22 controller 164 controls their fiber-end carriages 130 to move the fiber ends to the appropriate alignment coordinates stored in the memory. Optionally, once switch ends 45 of a top and bottom fiber 21 and 22 are aligned facing each other, a device on the fiber-end carriage of at least one of the aligned fibers is controllable to move at least one of one of the switch ends to reduce a distance between the switch ends. Optionally, the device is controllable to bring the switch ends substantially in contact with each other. Suitable devices for moving switch ends towards each other are described in PCT publication WO 02/43432 referenced above.

Figure 14A:
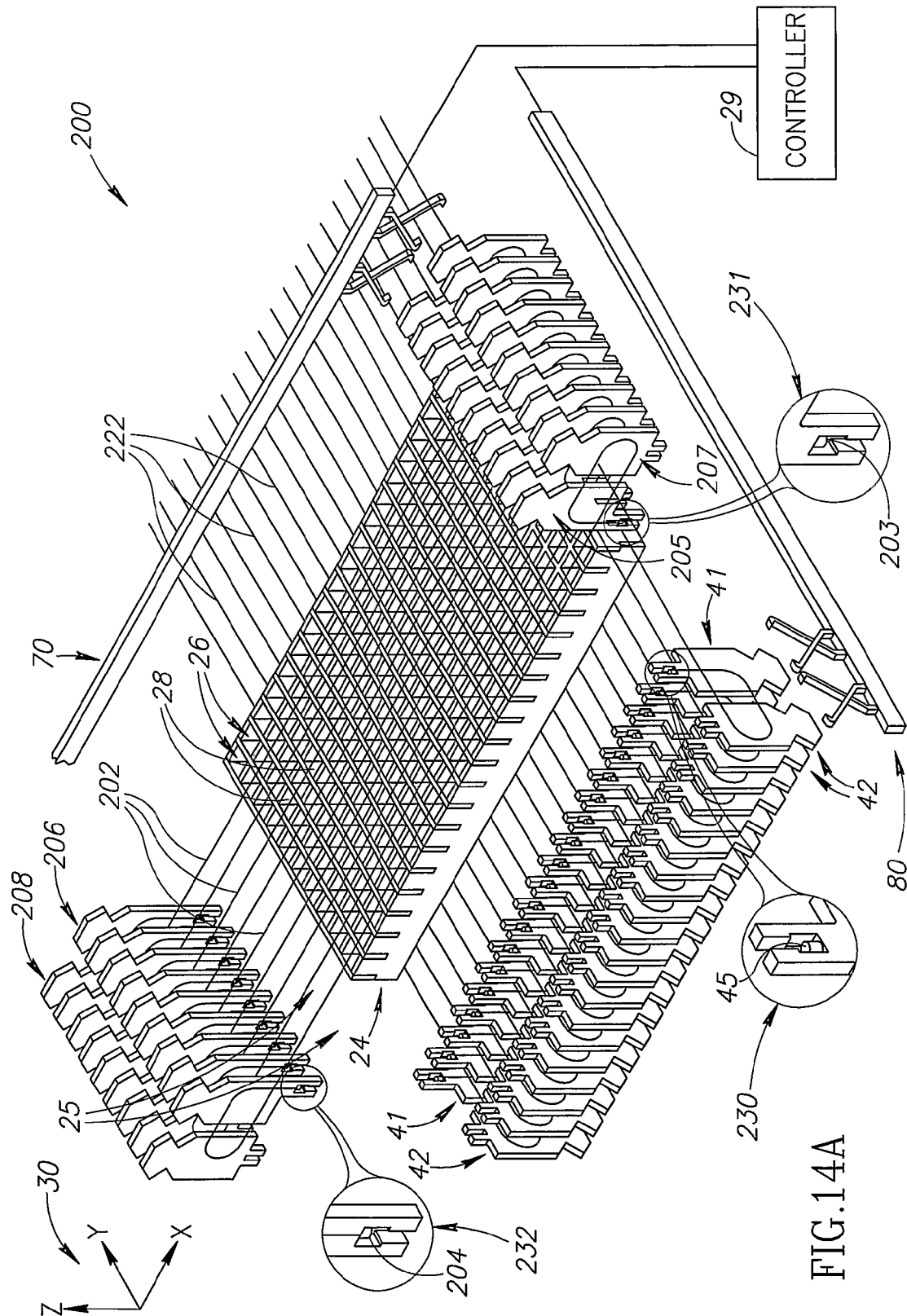
FIGS. 14A and 14B schematically show an optically crossbar switch comprising patch fibers for optically coupling any first and second signal fibers of a plurality of signal fibers in accordance with an embodiment of the invention.
Figure 14B:
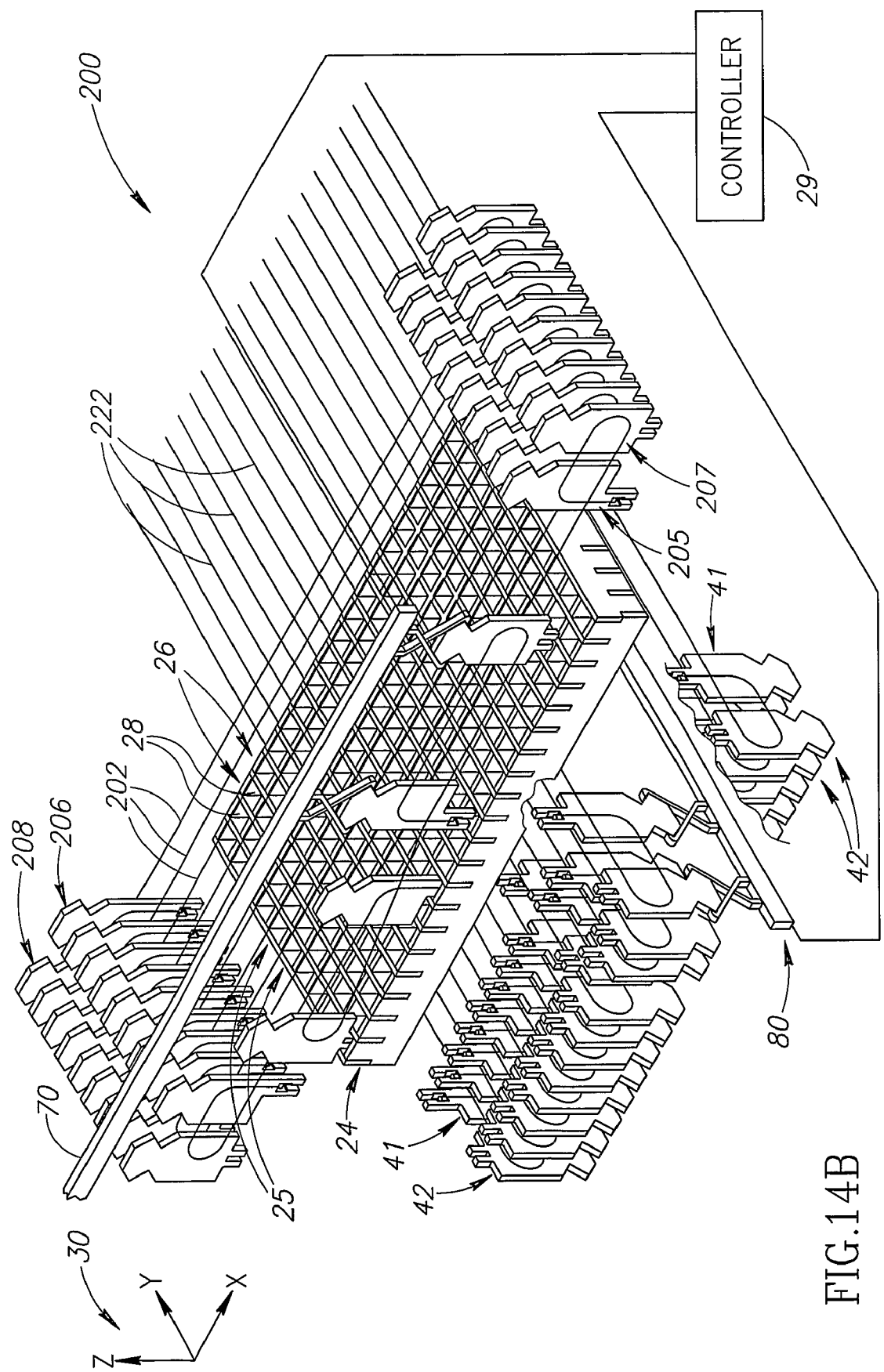

In some embodiments of the invention, a crossbar switch comprises patch fibers for optically coupling fibers. FIGS. 14A and 14B schematically show a crossbar switch 200 comprising a plurality of patch fibers 202 that are used to optically couple any given first fiber of a plurality of signal fibers 222 to any given second signal fiber of the plurality of fibers. FIG. 14A schematically shows crossbar switch 200 in a state in which none of the signal fibers are coupled to each other by a patch fiber. FIG. 10B schematically shows a patch fiber 202 and two signal fibers 222 being positioned so that the patch fiber can optically couple the signal fibers.

Signal fibers 222 have switch ends 45 and are optionally configured similarly to bottom fibers 22 shown in FIG. 1A and FIG. 3 and each is coupled to a fiber-end carriage 41 and a slack-control carriage 42. A portion of a fiber-end carriage 41 associated with a signal fiber 222 is shown enlarged for clarity of presentation in an inset 230. Optionally, crossbar switch 200 comprises a socket array 24 comprising rows and columns 26 and 25 of sockets 28 and at least one mover 80. The mover is controllable to insert a fiber end 45 of each signal fiber 222 into any desired socket 28 along a low 26 of sockets 28 associated with the signal fiber without substantially generating slack in the fiber.

Each patch fiber 202 comprises first and second patch ends 203 and 204 mounted to first and second fiber-end carriages 205 and 206 respectively, optionally, similarly to the way in which fiber end 45 of a fiber 21 shown in FIG. 2A is mounted to fiber-end carriage 41. A portion of fiber-end carriages 205 and 206 and patch ends 203 and 204 are schematically shown enlarged for clarity of presentation in insets 231 and 232. Optionally, the patch fiber is mounted to first and second slack-control carriages 207 and 208 respectively similarly to the manner in which fiber 21 is mounted to slack-control carriage 42 (e.g. FIG. 2A). Optionally, a mover 70 is controllable to grab and move first fiber-end carriage 205 and first slack-control carriage 207 associated with first patch end 203 of a patch fiber 202 to position the patch end in any given socket 28 along a column 25 of the sockets associated with the patch fiber without generating substantial slack in the fiber. Similarly, mover 70 is controllable to grab and move second fiber-end and slack-control carriages 206 and 208 to position second end 204 in any socket 28 of the same column 25 of the sockets.

To optically couple any first signal fiber 222 to any second signal fiber 222 controller 29 controls mover 80 to grab and move fiber-end and slack-control carriages 41 and 42 of the two fibers to insert fiber ends 45 of the fibers in sockets 28 of a same given column 25 of the sockets. Controller 29 uses a patch fiber 202 associated with the same given column of sockets to optically couple the ends 45 of the first and second fibers. The controller controls mover 70 to move first and second fiber-end carriages 205 and 206 and their associated first and second slack-control carriages 207 and 208 to insert first and second ends 203 and 204 of the patch fiber into sockets 28 in the column of sockets into which ends 45 of the signal fibers are inserted. In FIG. 14B fiber-end carriage 206 and its associated slack-control carriage 208 of a patch fiber 202 are shown inserted into sockets 28 appropriate for optically coupling two signal fibers 222. The patch fiber's fiber-end and slack-control carriages 205 and 207 are shown in the process of being positioned and inserted into appropriate sockets 28.

Whereas mover 70 in FIGS. 14A and 14B comprises two grabbers, a mover similar to mover 70, in accordance with an embodiment of the invention may comprise, for example, four grabbers. Mover 70 in FIGS. 14A and 14B can be operated to simultaneously move and position only two of the four carriages associated with a given patch fiber 202 shown in the figures. A mover comprising four carriages can be operated to simultaneously move and position all four of the carriages shown associated with an optic fiber in the figures.

It is noted that in optical crossbar switch 200 each patch fiber 202 is mounted to two slack-control carriages, i.e. first and second slack-control carriages 207 and 208. In some embodiments of the invention, a number of slack-control carriages different from two may be used to take up slack and real out patch fiber length. For example, a single slack-control carriage may be used.

It is further noted that whereas a crossbar switch, such as crossbar switch 20 shown in FIG. 1, can be controlled to optically couple any top fiber 21 to any bottom fiber 22, the switch is not controllable to optically couple a top fiber to another top fiber or a bottom fiber to another bottom fiber. In contradistinction, a crossbar switch similar to crossbar switch 200 can be controlled to optically couple any signal fiber 222 in the switch to any other signal fiber 222 in the switch.

In a crossbar switch in accordance with some embodiments of the invention, any first signal fiber of a plurality of signal fibers is optically coupled to any second fiber of the plurality of signal fibers using optical devices or systems that direct light, hereinafter "light directors", to generate a free space optical channel that optically couples the fibers.

Figure 15:
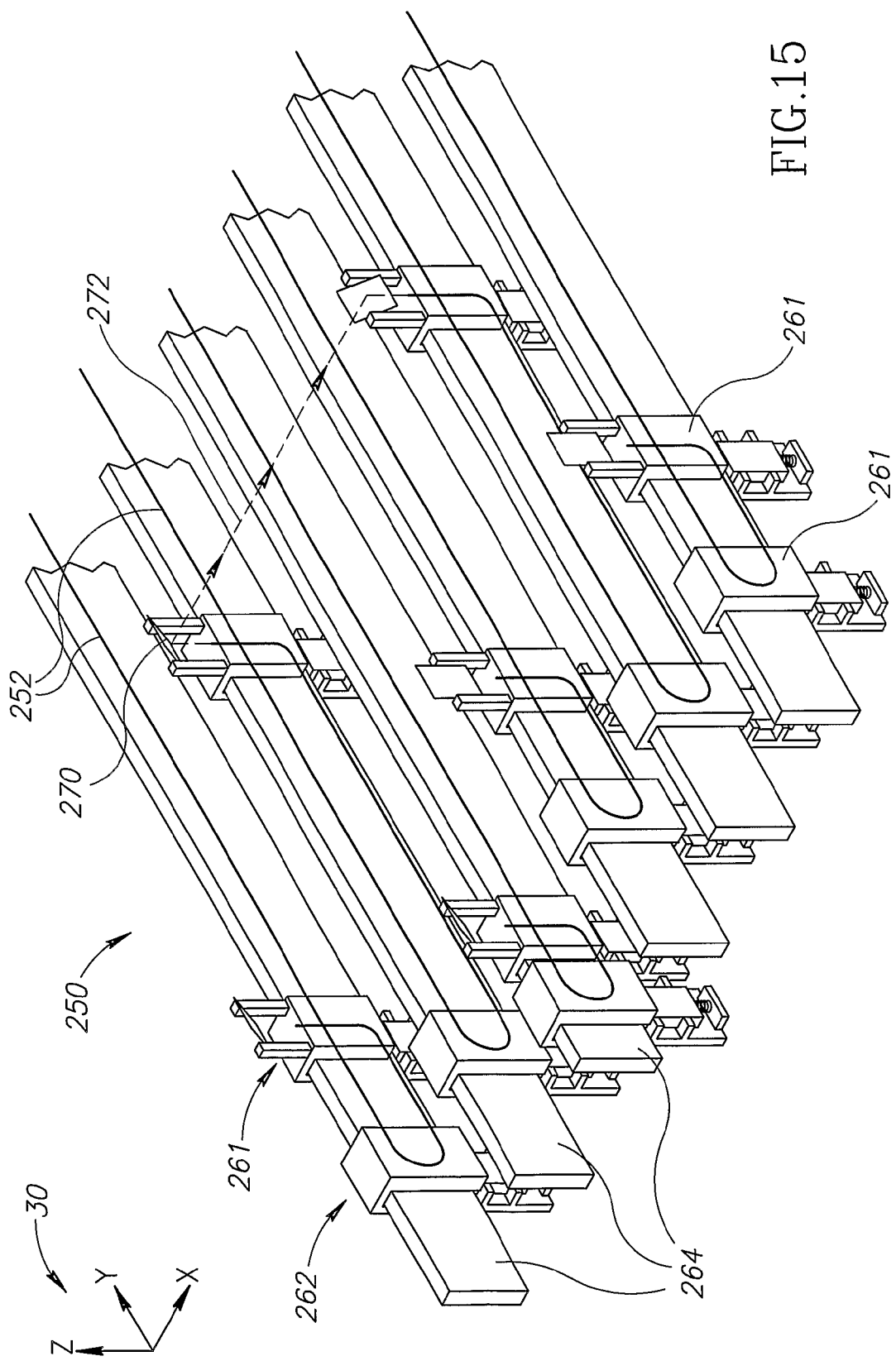
FIG. 15 schematically shows a crossbar switch that generates free space optical channels between signal fibers to optically couple the fibers, in accordance with an embodiment of the invention.

FIG. 15 schematically shows a crossbar switch 250 that generates free space optical channels between signal fibers 252 comprised in the switch, in accordance with an embodiment of the invention. Signal fibers 252 are optionally mounted to fiber-end and slack-control carriages 261 and 262 that move along guide rails 264 similarly to the manner in which bottom fibers 22 in crossbar switch 120 (FIG. 12) are mounted to fiber-end and slack-control carriages 130 and 131 that move along guide rails 178.

Each fiber-end carriage 261 comprises a light director, optionally a "coupling mirror" 270, having at least two tilt positions. In a first, clockwise tilt position, mirror 270 receives light from a switch end 45 of signal fiber 252 mounted to fiber-end carriage 261 and directs it along the positive x-direction. In a second counterclockwise tilt position, mirror 270 receives light from fiber 252 and directs the light along the negative x-direction. In the clockwise and counterclockwise tilt positions, mirror 270 receives light propagating along the negative and positive x-directions respectively and directs the light to enter switch end 45 of the fiber. Coupling mirrors 270 may be mounted to fiber-end carriages 261 and controlled to be selectively tilted to clockwise and counterclockwise tilt positions using any of various techniques and devices known in the art. For example, mirrors 270 may be micro fabricated mirrors controlled by electrostatic forces or mechanically tilted using suitable actuators or motors.

To optically couple a first signal fiber 252 to a second signal fiber 252 the signal fibers are moved to a same y-coordinate. Mirror 270 associated with the signal fiber of the first and second signal fibers having a smaller x-coordinate is tilted to the clockwise tilt position and mirror 270 associated with the other of the first and second fibers is tilted to the counterclockwise tilt position. The tilted mirrors direct optical signals exiting switch end 45 of one of first and second fibers 252 to enter the switch end of the other of the two fibers. FIG. 15 schematically shows first and second signal fiber 252 optically coupled by their respective mirrors 270 and optical signals represented by a dashed arrowed line 272 being transmitted between the two fibers.

In some embodiments of the invention, coupling mirrors have, in addition to clockwise and counterclockwise tilt positions, a "neutral position" in which light exiting a fiber with which the mirror is associated is not deflected by the reflector. Such "three-way" coupling mirrors are, optionally, incorporated in an optical crossbar switch, such as for example a crossbar switch similar to crossbar switch 120 shown in FIG. 12, which comprises an array of top and bottom fibers, in accordance with an embodiment of the present invention. Whereas crossbar switch 120 is controllable to optically couple any top fiber 21 to any bottom fiber 22 the crossbar switch is not controllable to optically couple a top fiber or a bottom fiber to a bottom fiber. In a crossbar switch similar to crossbar switch 120 and incorporating three-way mirrors, in accordance with an embodiment of the invention, the three-way mirrors enable the crossbar switch to optically couple any bottom fiber to any top fiber and in addition to couple any bottom fiber to any other bottom fibers and any top fiber to any other top fiber. Operation of a three-way coupling mirror is schematically shown in FIGS. 16A-16C and a crossbar switch comprising top and bottom fibers and three-way coupling mirrors is shown in FIG. 17 and discussed below.

Figure 16A:
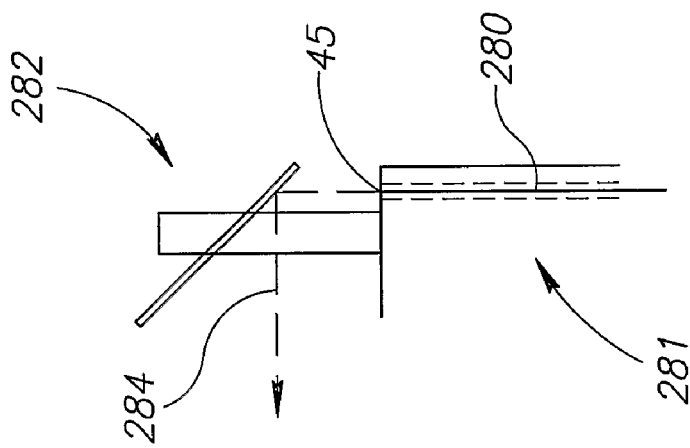
FIGS. 16A-16C schematically show positions of mirrors that are used to generate free space optical channels in a crossbar switch similar to the crossbar switch shown in FIG. 11, in accordance with an embodiment of the invention.
Figure 16B:
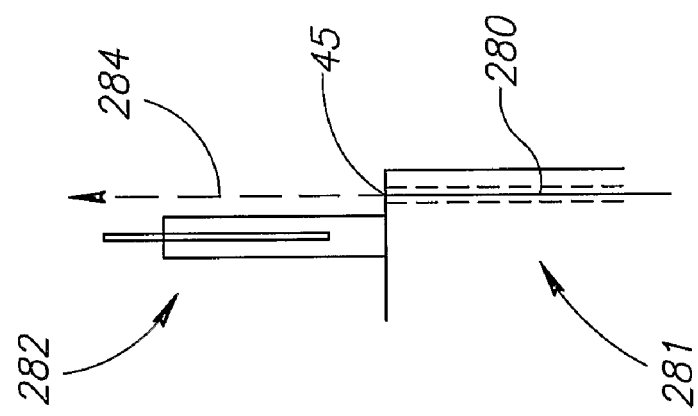
Figure 16C:
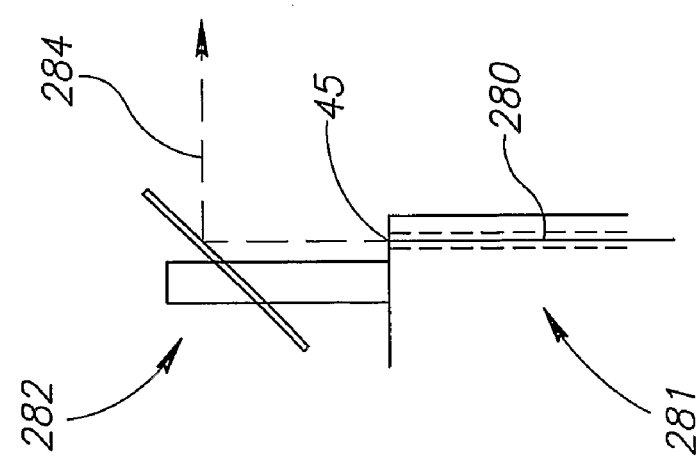

FIGS. 16A-16C schematically show a cross-section of an optic fiber 280 having a switch end 45 mounted to a fiber-end carriage 281, optionally similar to fiber-end carriage 261 (FIG. 15), having a three-way mirror 282, in accordance with an embodiment of the invention. The figures show three-way mirror 282 in clockwise, neutral and counterclockwise tilt positions respectively. In the clockwise position (FIG. 16A), mirror 282 deflects light represented by dashed arrowed line 284 from fiber 280 in the positive x-direction. In the counterclockwise tilt position (FIG. 16A), the mirror deflects light 284 in the negative x-direction and in the neutral position (FIG. 16B) mirror 282 does not deflect the light.

Figure 17:
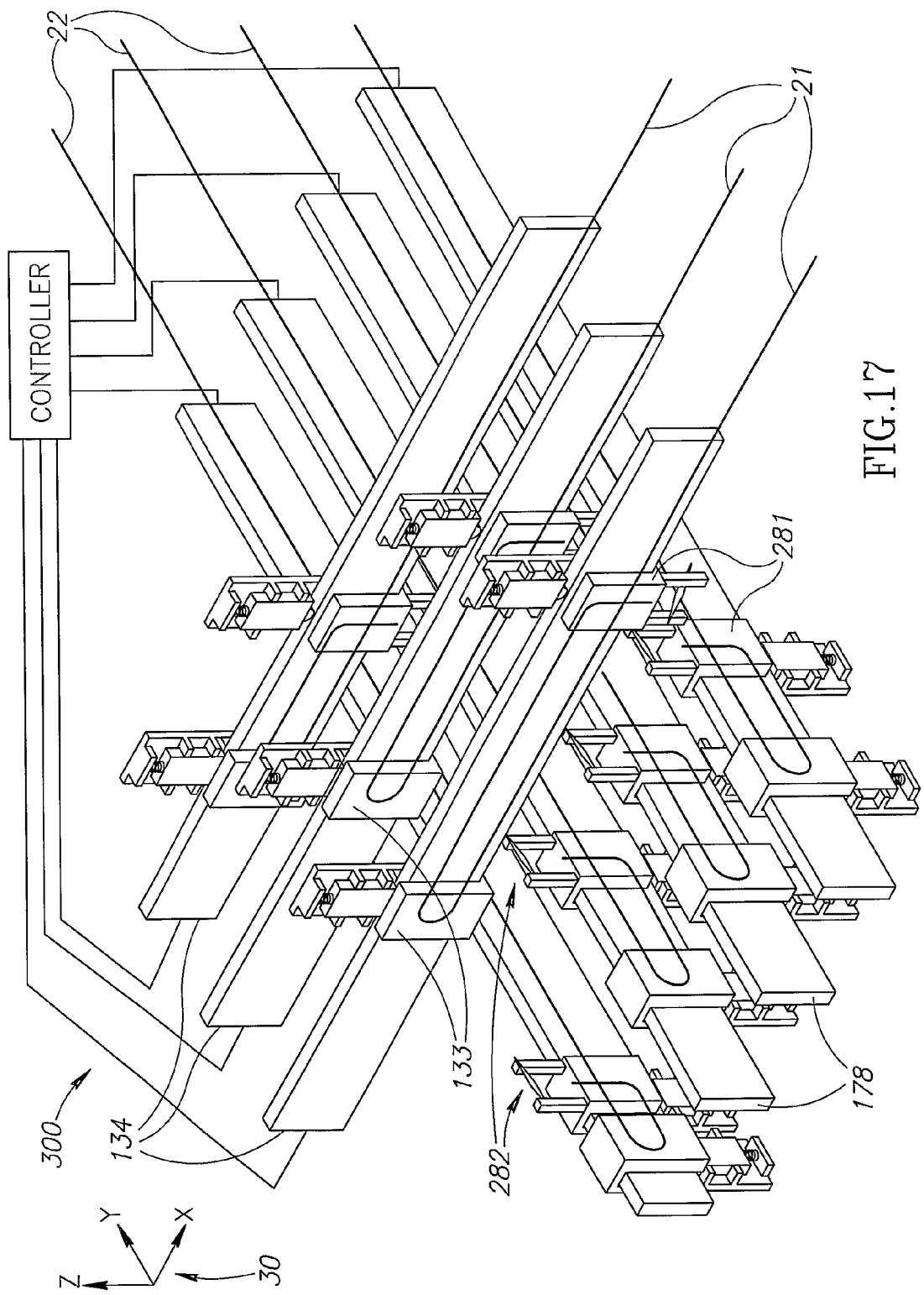
FIG. 17 schematically shows an optical crossbar switch for optically coupling any fiber in the switch to any other fiber in the switch, in accordance with an embodiment of the invention.

FIG. 17 schematically shows an optical crossbar switch 300 similar to optical crossbar switch 120 (FIG. 12), but comprising in addition, three-way coupling mirrors, in accordance with an embodiment of the invention. Each top and bottom fiber 21 and 22 is coupled to a fiber-end carriage 281 having a three-way mirror 282 (FIGS. 16A-16C) and a slack-control carriage 133, similar to that comprised in crossbar switch 120. When a mirror 282 of a given top or bottom fiber 21 or 22 is in its neutral position, (FIG. 16B) the given fiber may be optically coupled to any bottom or top fiber 22 or 21 respectively also having its mirror in a neutral position. To optically couple any bottom fiber 22 to any other bottom fiber 22 of crossbar switch 300, fiber-end carriages 281 of the fibers and their coupling mirrors 282 are controlled similarly to the way fiber-end carriages 261 and coupling mirrors 270 in crossbar switch 250 (FIG. 15) are controlled to optically couple two signal fibers 252. Any top fiber 21 in crossbar switch 300 is similarly optically coupled to any other top fiber 21 in the crossbar switch.

Light directors in accordance with embodiments of the invention may comprise other than mirrors, and may have degrees of freedom of motion different from those described above. For example, a light director may be a surface of a beam splitter, comprise a light pipe that can be oriented in different positions to direct light in desired directions or comprise an electronically or acoustically controlled optical switch to direct light. A coupling mirror in accordance with an embodiment of the invention is not necessarily constrained to be rotatable to different tilt positions and may in addition, or alternatively, be rotatable about an axis, e.g. the z-axis, perpendicular to an axis about which the mirror is tilted to different tilt positions. Rotation about the z-axis may be used to optically couple fibers located at different y-coordinates.

It is noted, that whereas coupling mirrors are shown in use with crossbar switches in accordance with embodiments of the invention that do not comprise socket arrays, coupling mirrors may be used with crossbar switches in accordance with embodiments of the invention that do comprise socket arrays. For example, fiber-end carriages and an associated socket array may be configured so that when a fiber-end carriage is inserted into one side of a socket in the socket array, its coupling mirror protrudes to the other side of the socket. On the other side of the socket, the coupling mirror may be tilted to deflect light from a fiber coupled to the fiber-end carriage in a desired direction. For a crossbar switch comprising arrays of top and bottom fibers, (e.g. FIG. 1) the fiber arrays are optionally associated with top and bottom socket arrays respectively. When a fiber-end carriage of a top or bottom fiber is inserted into a socket of its top or bottom socket array, an associated coupling mirror protrudes to the other side of the socket.

Furthermore, whereas in the exemplary embodiments described all the fiber were configured in planar arrays, in some embodiments of the invention optic fibers are configured in other than planar arrays. For example, the fibers may be configured in cylindrical arrays such as described in WO 02/43432 referenced above, with at least some of the fibers connected to fiber-end and slack-control carriages to control position of their switch ends and slack.

It is also noted that whereas in the exemplary embodiments, the fiber ends of all fibers comprised in a crossbar switch are moveable by a fiber-end carriage, it is of course possible to have a crossbar switch in accordance with an embodiment of the invention in which some of the fiber ends in the switch are held stationary in a fixed array. For example, in an embodiment of the invention, ends of, optionally, "bottom" fibers may be held in fixed positions in an optionally rectangular array of rows and columns of bottom fiber ends. Each of a plurality of "top" fibers in the crossbar switch is optionally coupled to a fiber-end and slack-control carriage similarly to the way top fibers 21 in crossbar switch 20 are coupled to fiber-end and slack-control carriages 41 and 42. The trajectory of each top fiber is optionally aligned with a different row of fiber ends in the rectangular array of bottom fiber ends and the carriages associated with the fiber controllable to connect the top fiber with any of the fibers having its end located in the row.

It is additionally noted that methods and devices for managing optically coupling and uncoupling optic fibers may be used in manual crossbar switches. For example, instead of a mechanical mover controlled by a controller for moving fiber-end and slack-control carriages of fibers, carriages in a crossbar switch in accordance with an embodiment of the invention may be moved manually.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. An optical crossbar switch for optically coupling optic fibers comprising:
    at least one first fiber and a plurality of second fibers;
    a moveable fiber-end carriage coupled to an end of the at least one first fiber and constrained to move along a predetermined trajectory;
    at least one moveable slack-control carriage coupled to the body of the at least one first fiber and constrained to move along a substantially same trajectory as the fiber end carriage; and at least one moving device controllable to move the carriages;

wherein, to optically couple a first fiber of the at least one first fiber to a second fiber of the plurality of second fibers, the at least one moving device moves the fiber-end carriage of the first fiber along its trajectory to a position at which the end of the first fiber is optically coupled to an end of the second fiber and moves the at least one slack-control carriage to take up slack in the first fiber generated by movement of its fiber-end carriage.

2. An optical crossbar switch according to claim 1 wherein both ends of a first fiber are coupled to different fiber-end carriages moveable along predetermined trajectories and the at least one moving device moves the carriages to positions at which the ends of the first fiber are optically coupled to ends of different second fibers to optically couple the second fibers to each other.

3. An optical crossbar switch according to claim 1 wherein the at least one slack-control carriage comprises two slack control carriages.

4. An optical crossbar switch according to claim 1 wherein to optically couple the first fiber to a second fiber the at least one moving device moves the fiber-end carriage of the first fiber to align the end of the first fiber facing the end of the second fiber.

5. An optical crossbar switch according to claim 1 wherein ends of the second fibers are located at fixed positions.

6. An optical crossbar switch according to claim 1 and comprising a moveable fiber-end carriage coupled to the end of each second fiber and a moveable slack-control carriage coupled to the body of each second fiber, which carriages are constrained to move along predetermined trajectories.

7. An optical crossbar switch according to claim 6 wherein to couple a first fiber to a second fiber, the at least one moving device moves the fiber-end carriage of the second fiber to align the end of the second fiber facing the end of the first fiber.

8. An optical crossbar switch according to claim 6 wherein a projection of the trajectory of each fiber-end carriage of the at least one first fiber crosses the trajectories of the fiber-end carriages of all the second fibers.

9. An optical crossbar switch according to claim 6 wherein the projection of the trajectory of the fiber-end carriage of a first fiber is perpendicular to the trajectories of the fiber-end carriages of the second fibers that it crosses.

10. An optical crossbar switch according to claim 6 wherein the trajectories of the fiber-end carriages of the second fibers are parallel.

11. An optical crossbar switch according to claim 6 wherein the trajectories of the fiber-end carriages of the second fibers are coplanar.

12. An optical crossbar switch according to claim 1 wherein the at least one first fiber comprises a plurality of first fibers.

13. An optical crossbar switch according to claim 12 wherein the trajectories of the fiber-end carriages of the first fibers are parallel.

14. An optical crossbar switch according to claim 12 wherein the trajectories of the fiber-end carriages of the first fibers are coplanar.

15. An optical crossbar switch according to claim 12 wherein the trajectories of the fiber-end carriages of the first fibers are coplanar and the trajectories of the fiber-end carriages of the second fibers are coplanar and the planes of the trajectories are parallel.

16. An optical crossbar switch according to claim 1 wherein the trajectories of the fiber-end carriages are straight-line trajectories.

17. An optical crossbar switch according to claim 1 wherein the trajectories of the slack-control carriages are straight-line trajectories.

18. An optical crossbar switch according to claim 1 wherein for a given fiber coupled to a fiber-end carriage and at least one slack-control carriage at least two lengths of the fiber body extend between the fiber-end carriage and a slack control carriage of the at least one slack-control carriage and a section of the fiber body coupled to the at least one slack-control carriage is free to move along its length.

19. An optical crossbar switch for optically coupling optic fibers comprising:

at least one first fiber and a plurality of second fibers; a moveable fiber-end carriage coupled to an end of the at least one first fiber and constrained to move along a predetermined trajectory; at least one moveable slack-control carriage which is coupled to the body of the at least one first fiber so that at least two lengths of the fiber extend between the fiber-end carriage and slack control carriage and is constrained to move along a predetermined trajectory; and at least one moving device controllable to move the carriages; wherein to optically couple a first fiber of the at least one first fiber to a second fiber of the plurality of second fibers, the at least one moving device moves the fiber-end carriage of the first fiber along its trajectory to a position at which the end of the first fiber is optically coupled to an end of the second fiber and moves the at least one slack-control carriage to take up slack in the first fiber generated by movement of its fiber-end carriage.

20. An optical crossbar switch according to claim 19 wherein a slack-control carriage of the at least one slack-control carriage is formed with a channel and the section of the fiber body is threaded through the channel.

21. An optical crossbar switch according to claim 19 wherein a slack-control carriage of the at least one carriage is formed with a groove along which the section of the fiber lies.

22. An optical crossbar switch according to claim 19 wherein a slack-control carriage of the at least one slack-control carriage comprises a pulley wheel and the fiber body loops around a region of the rim of the pulley wheel.

23. An optical crossbar switch according to claim 1 wherein the at least one moving device for moving carriages comprises at least two grabbers controllable to simultaneously grab the fiber-end carriage and the at least one slack-control carriage of a fiber.

24. An optical crossbar switch according to claim 23 wherein the grabbers are controllable to simultaneously move the fiber-end carriage and the at least one slack-control carriage of the fiber along their respective trajectories.

25. An optical crossbar switch according to claim 1 wherein the at least one moving device for moving the carriages comprises a motor for each carriage controllable to move the carriage along its trajectory.

26. An optical crossbar switch according to claim 1 wherein each carriage is mounted to a guide rail along which the carriage moves.

27. An optical crossbar switch according to claim 1 and comprising an array of sockets and wherein to optically couple a first fiber to a second fiber, the at least one moving device moves the fiber-end carriage of at least one of the first and second fibers to a socket and inserts the fiber's fiber end into the socket.

28. An optical crossbar switch according to claim 27 wherein the socket provides support for maintaining the fiber-end carriage in a position that provides optical contact of the fibers.

29. An optical crossbar switch according to claim 1 wherein the fiber-end carriage of a fiber comprises a light director controllable to direct light that exits the end of the fiber so that the light is incident on the end of another fiber.

30. An optical crossbar switch for optically coupling optic fibers comprising:
   plurality of optic fibers;
   a moveable fiber-end carriage coupled to an end of each of the plurality of optic fibers and constrained to move along a predetermined trajectory;
   at least one moveable slack-control carriage coupled to the body of each fiber and constrained to move along a predetermined trajectory;
   at least one moving device controllable to move the carriages;
   a light director coupled to each fiber-end carriage so that for any pair of the fibers and at least one set of positions of their fiber-end carriages along their respective trajectories, the light directors are controllable to direct light between their ends; and
   wherein to optically couple a pair of the fibers the at least one moving device moves their fiber-end carriages to the at least one set of positions at which their light directors are controllable to direct light between their fiber ends.

31. An optical crossbar switch according to claim 30 wherein the light director is controllable to deflect light that exits the fiber selectively along different directions.

32. An optical crossbar switch according to claim 30 wherein the light director is controllable not to deflect light that exits the fiber.

33. An optical crossbar switch according to claim 30 wherein the light director comprises a light pipe.

34. An optical crossbar switch according to claim 30 wherein the light director comprises an optical switch controllable to direct light along different directions.

35. An optical crossbar switch according to claim 34 wherein the optical switch is controlled electronically.

36. An optical crossbar switch according to claim 34 wherein the optical switch is controlled acoustically.

37. An optical crossbar switch for optically coupling optic fibers comprising:
   a first optic fiber;
   a light detection discontinuity in the first fiber that allows a portion of light being transmitted in the first fiber to exit the fiber; and
   a first optical detector operable to detect light exiting the first fiber at the discontinuity therein wherein the first optical detector is movable to an operative position in proximity to the discontinuity to detect light exiting the first fiber.

38. An optical crossbar switch according to claim 37 wherein the first optical detector is movable from a first position to the operative position.

39. An optical crossbar switch according to claim 38 wherein the first position is a parking position.

40. An optical crossbar switch according to claim 38 wherein the first optical detector is movable from the first position to the operative position along a first axis into alignment with the discontinuity in the first fiber at a first distance from the discontinuity, and along a second axis perpendicular to the first axis to a second distance from the discontinuity.

41. An optical crossbar switch according to claim 37 wherein the discontinuity is formed by a bend in the first fiber.

42. An optical crossbar switch according to claim 41 wherein the bend has a radius of between about 1 mm and about 4 mm.

43. An optical crossbar switch according to claim 37 further including:
   a plurality of second fibers:
      a light detection discontinuity in each of the second fibers that allows a portion of light being transmitted in each second fiber to exit the fiber; and
      a second optical detector that is operable to detect light exiting from the second fibers.

44. An optical crossbar switch according to claim 43 wherein:
   the first optical detector is movable from a first position to a selectable operative position in proximity to the discontinuity in the first fiber to detect light exiting the first fiber; and
   the second optical detector is movable from a first position to an operative position in proximity to the discontinuity in any selectable one of the fibers of the second plurality of fibers to detect light exiting the one second fiber.

45. An optical crossbar switch according to claim 44 wherein the respective first positions of the first and second detectors are parking positions.

46. An optical crossbar switch according to claim 44 wherein the first optical detector is movable from its first position along a first axis into alignment with the discontinuity in the first fiber at a first distance from the discontinuity therein, and along a second axis perpendicular to the first axis to a second distance from the discontinuity in the first fiber.

47. An optical crossbar switch according to claim 46 wherein the second optical detector is movable from its first position along a first axis into alignment with the discontinuity in the one second fiber at a first distance from the discontinuity therein, and along a second axis perpendicular to the first axis to a second distance from the discontinuity in the second fiber.

48. An optical crossbar switch according to claim 47 wherein the first axis of movement of the first detector is perpendicular to the first axis of movement of the second detector.

49. An optical crossbar switch according to claim 48 wherein the second axis of movement of the first detector is parallel to the second axis of movement of the second detector.

50. An optical crossbar switch according to claim 43 wherein the discontinuities in the first fiber and in the plurality of second fibers are formed by respective bends in the fibers.

51. An optical crossbar switch according to claim 50 wherein the bends have radii of between about 1 mm and about 4 mm.

52. An optical crossbar switch according to claim 43 further including additional optic fibers, which, together with the first optic fiber, comprise a plurality of first optic fibers, wherein each additional fiber includes a light detection discontinuity that allows a portion of light being transmitted therein to exit the fiber; and wherein the first optical detector is movable from a first position to an operative position in proximity to the discontinuity in any selectable one of the fibers of the first plurality of fibers to detect light exiting the one first fiber.

53. An optical crossbar switch according to claim 52 further including:
   a first carriage assembly coupled to the fibers of the plurality of first fibers, the carriage assembly being operable to move of a selected one of the plurality of first fibers to a position at which it is optically coupled to an end of a selected second fiber; and a first moving device for controllably moving the first carriage assembly, wherein the first optical detector is mounted on the first moving device, and the first moving device is operable to position the first optical detector in proximity to the light detection discontinuity in the selected one of the plurality of first fibers.

54. An optical crossbar switch according to claim 52 further including:

a second carriage assembly coupled to the fibers of the plurality of second fibers, the second carriage assembly being operative to move a selected one of the plurality of second fibers to a position at which it is optically coupled to a selected first fiber; and a moving device for controllably moving the second carriage assembly, wherein the second optical detector is mounted on the second moving device and the second moving device is operable to position the second optical detector in proximity to the light detection discontinuity in the selected one of the plurality of second fibers.

55. An optical crossbar switch according to claim 37 further including:

a carriage assembly coupled to the first fiber, the carriage assembly being operative to move the first fiber to a position at which it is optically coupled to a selected second fiber; and a moving device for controllably moving the carriage assembly for the first fiber, wherein the first optical detector is mounted on the moving device.

* * * * *